United States Patent
Funk et al.

(10) Patent No.: US 10,318,569 B1
(45) Date of Patent: Jun. 11, 2019

(54) SMART INVENTORY TAGS

(71) Applicant: Square, Inc., San Francisco, CA (US)

(72) Inventors: Mark Funk, San Francisco, CA (US);
Claudia J. Ng, San Bruno, CA (US);
Imran Khan, San Rafael, CA (US);
Jennifer Murse, San Francisco, CA (US)

(73) Assignee: Square, Inc., San Francisco, CA (US)

( * ) Notice: Subject to any disclaimer, the term of this patent is extended or adjusted under 35 U.S.C. 154(b) by 0 days.

(21) Appl. No.: 15/858,911

(22) Filed: Dec. 29, 2017

(51) Int. Cl.
| | | |
|---|---|---|
| G06F 16/38 | (2019.01) | |
| G06K 7/14 | (2006.01) | |
| G06Q 10/08 | (2012.01) | |
| G06Q 20/32 | (2012.01) | |
| G06F 16/951 | (2019.01) | |
| G06K 7/10 | (2006.01) | |

(52) U.S. Cl.
CPC .......... *G06F 16/381* (2019.01); *G06F 16/951* (2019.01); *G06Q 10/087* (2013.01); *G06Q 20/3278* (2013.01); *G06K 7/10297* (2013.01); *G06K 7/1434* (2013.01)

(58) Field of Classification Search
CPC ................... G06F 17/30725; G08F 17/30864
USPC ...................................................... 340/572.1
See application file for complete search history.

(56) References Cited

U.S. PATENT DOCUMENTS

| | | |
|---|---|---|
| 5,057,829 A | 10/1991 | Velazquez |
| 5,933,813 A | 8/1999 | Teicher et al. |
| 6,151,582 A | 11/2000 | Huang et al. |
| 6,431,444 B1 | 8/2002 | Gatto |
| 6,609,101 B1 | 8/2003 | Landvater |
| 7,222,786 B2 | 5/2007 | Renz et al. |
| 7,343,319 B1 | 3/2008 | Walker et al. |
| 7,552,066 B1 | 6/2009 | Landvater |
| 7,660,738 B1 | 2/2010 | Siegel et al. |
| 7,792,256 B1 | 9/2010 | Arledge et al. |
| 7,818,284 B1 | 10/2010 | Walker et al. |

(Continued)

FOREIGN PATENT DOCUMENTS

CA    2 332 083 A1    7/2001

OTHER PUBLICATIONS

Non-Final Office Action dated Apr. 24, 2017, for U.S. Appl. No. 14/700,044, of Brock, Z., et al., filed Apr. 29, 2015.

(Continued)

*Primary Examiner* — Santiago Garcia
(74) *Attorney, Agent, or Firm* — Lee & Hayes, P.C.

(57) ABSTRACT

Smart inventory tags are described herein. In an example, a service provider can determine interaction capability(s) for a tag associated with an item in an inventory of a merchant. The tag can be configured to be positioned proximate to the item offered for sale by the merchant at a physical store of the merchant. The service provider can receive an indication associated with a selection of at least one interaction capability of the interaction capability(s) and, based at least in part on the indication, the service provider can generate encoded information associated with the at least one interaction capability. The service provider can generate an instruction for generating the tag including the encoded information to enable a presentation of a user interface associated with the at least one interaction via a device operated by a user at the physical store of the merchant.

20 Claims, 6 Drawing Sheets

(56) References Cited

U.S. PATENT DOCUMENTS

| | | |
|---|---|---|
| 7,979,299 B1 | 7/2011 | Mehta et al. |
| 8,001,017 B1 | 8/2011 | Franco |
| 8,103,538 B2 | 1/2012 | Bamberg et al. |
| 8,204,799 B1 | 6/2012 | Murray et al. |
| 8,417,572 B1 | 4/2013 | Chenault |
| 8,438,066 B1 | 5/2013 | Yuen et al. |
| 8,533,053 B2 | 9/2013 | Brown et al. |
| 8,732,040 B1 | 5/2014 | Prabhune et al. |
| 9,168,315 B1 | 10/2015 | Scaringe et al. |
| 9,619,483 B1* | 4/2017 | Robinson .......... G06F 17/30206 |
| 9,619,831 B1 | 4/2017 | Kumar et al. |
| 9,786,005 B1 | 10/2017 | Poursartip et al. |
| 9,792,597 B1 | 10/2017 | Jen et al. |
| 2001/0034722 A1 | 10/2001 | Tidball et al. |
| 2001/0042008 A1 | 11/2001 | Hull et al. |
| 2002/0010661 A1 | 1/2002 | Waddington et al. |
| 2002/0065839 A1 | 5/2002 | McCulloch |
| 2002/0072988 A1 | 6/2002 | Aram |
| 2002/0188579 A1 | 12/2002 | Liu et al. |
| 2003/0006098 A1 | 1/2003 | Wike, Jr. et al. |
| 2003/0018701 A1 | 1/2003 | Kaestle et al. |
| 2003/0026404 A1 | 2/2003 | Joyce et al. |
| 2003/0033179 A1 | 2/2003 | Katz et al. |
| 2003/0046133 A1 | 3/2003 | Morley et al. |
| 2003/0151821 A1 | 8/2003 | Favalora et al. |
| 2004/0019552 A1 | 1/2004 | Tobin |
| 2004/0039639 A1 | 2/2004 | Walker et al. |
| 2004/0098311 A1 | 5/2004 | Nair et al. |
| 2004/0181753 A1 | 9/2004 | Michaelides |
| 2005/0149414 A1* | 7/2005 | Schrodt ............... G06Q 10/087 |
| | | 705/29 |
| 2005/0250555 A1 | 11/2005 | Richardson et al. |
| 2005/0273377 A1 | 12/2005 | Ouimet et al. |
| 2006/0031085 A1 | 2/2006 | Postel et al. |
| 2006/0106699 A1 | 5/2006 | Hitalenko et al. |
| 2006/0195563 A1 | 8/2006 | Chapin et al. |
| 2006/0224470 A1 | 10/2006 | Garcia Ruano et al. |
| 2006/0235726 A1 | 10/2006 | Paraison et al. |
| 2006/0235739 A1 | 10/2006 | Levis et al. |
| 2006/0253330 A1 | 11/2006 | Maggio et al. |
| 2008/0077459 A1 | 3/2008 | Desai et al. |
| 2008/0103846 A1 | 5/2008 | Armstrong et al. |
| 2008/0147507 A1 | 6/2008 | Langhammer |
| 2008/0191881 A1* | 8/2008 | Minerley ............. G06Q 10/087 |
| | | 340/572.1 |
| 2008/0198761 A1 | 8/2008 | Murawski et al. |
| 2008/0201232 A1 | 8/2008 | Walker et al. |
| 2008/0216001 A1 | 9/2008 | Ording et al. |
| 2008/0228582 A1 | 9/2008 | Fordyce et al. |
| 2008/0301095 A1 | 12/2008 | Zhu et al. |
| 2009/0089148 A1 | 4/2009 | Gujjar et al. |
| 2010/0138037 A1 | 6/2010 | Adelberg et al. |
| 2010/0174596 A1 | 7/2010 | Gilman et al. |
| 2010/0234986 A1 | 9/2010 | Clopton et al. |
| 2011/0010448 A1 | 1/2011 | Gill et al. |
| 2011/0011931 A1 | 1/2011 | Farley et al. |
| 2011/0047022 A1 | 2/2011 | Walker et al. |
| 2011/0054649 A1 | 3/2011 | Sarkis et al. |
| 2011/0066504 A1* | 3/2011 | Chatow ................ G06Q 30/02 |
| | | 705/14.65 |
| 2011/0213644 A1 | 9/2011 | Phene |
| 2011/0225023 A1 | 9/2011 | Evens et al. |
| 2011/0238577 A1 | 9/2011 | Shuster |
| 2011/0258117 A1 | 10/2011 | Ahmad et al. |
| 2011/0313840 A1 | 12/2011 | Mason et al. |
| 2012/0016758 A1 | 1/2012 | Bouaziz et al. |
| 2012/0054076 A1 | 3/2012 | Wu et al. |
| 2012/0084119 A1 | 4/2012 | Vandehey et al. |
| 2012/0095882 A1* | 4/2012 | Wolff ................. G06Q 30/0643 |
| | | 705/27.2 |
| 2012/0116810 A1 | 5/2012 | Knowlton et al. |
| 2012/0209661 A1 | 8/2012 | Bennett et al. |
| 2012/0311723 A1 | 12/2012 | Britt, Jr. et al. |
| 2013/0006742 A1 | 1/2013 | Richard |
| 2013/0066698 A1* | 3/2013 | Levy .................. G06Q 30/0283 |
| | | 705/14.17 |
| 2013/0066733 A1* | 3/2013 | Levy ..................... G06Q 30/06 |
| | | 705/16 |
| 2013/0124360 A1 | 5/2013 | Mitrovic |
| 2013/0126610 A1* | 5/2013 | Aihara ................... G06Q 30/06 |
| | | 235/383 |
| 2013/0132180 A1* | 5/2013 | Aihara ............... G06Q 30/0222 |
| | | 705/14.23 |
| 2013/0132193 A1* | 5/2013 | Aihara ............... G06Q 30/0253 |
| | | 705/14.51 |
| 2013/0132218 A1* | 5/2013 | Aihara .................. G06Q 20/20 |
| | | 705/21 |
| 2013/0173435 A1 | 7/2013 | Cozad, Jr. |
| 2013/0246176 A1 | 9/2013 | Chang et al. |
| 2013/0282392 A1 | 10/2013 | Wurm |
| 2013/0311211 A1 | 11/2013 | Zafar et al. |
| 2014/0025524 A1 | 1/2014 | Sims et al. |
| 2014/0046748 A1 | 2/2014 | Nagarajan et al. |
| 2014/0067596 A1 | 3/2014 | McGovern et al. |
| 2014/0067677 A1 | 3/2014 | Ali et al. |
| 2014/0149201 A1 | 5/2014 | Abbott et al. |
| 2014/0180959 A1 | 6/2014 | Gillen et al. |
| 2014/0249941 A1* | 9/2014 | Hicks ................. G06K 7/10821 |
| | | 705/17 |
| 2014/0279241 A1 | 9/2014 | Bartholomew et al. |
| 2014/0330685 A1 | 11/2014 | Nazzari |
| 2014/0344118 A1 | 11/2014 | Parpia et al. |
| 2015/0066671 A1 | 3/2015 | Nichols et al. |
| 2015/0095091 A1 | 4/2015 | Kamdar |
| 2015/0100433 A1 | 4/2015 | Choy et al. |
| 2015/0134552 A1 | 5/2015 | Engels et al. |
| 2015/0302510 A1 | 10/2015 | Godsey et al. |
| 2015/0310397 A1* | 10/2015 | Xu ....................... G06Q 10/109 |
| | | 235/375 |
| 2016/0092827 A1 | 3/2016 | Colodny et al. |
| 2016/0321677 A1 | 11/2016 | Dobaj |
| 2017/0011423 A1* | 1/2017 | Douglas ............ G06Q 30/0261 |
| 2017/0032382 A1* | 2/2017 | Shulman ............... G06Q 30/06 |
| 2017/0236152 A1 | 8/2017 | Dimaunahan et al. |
| 2017/0345105 A1* | 11/2017 | Isaacson ................ H04L 63/06 |
| 2018/0025442 A1* | 1/2018 | Isaacson ................ H04L 63/06 |
| 2018/0150387 A1* | 5/2018 | Kogan .................... G06F 9/455 |
| 2018/0232817 A1* | 8/2018 | Isaacson ............ G06Q 30/0613 |

OTHER PUBLICATIONS

Non-Final Office Action dated Jun. 15, 2017, for U.S. Appl. No. 14/289,467, of Kumar, A., et al., filed May 28, 2014.

Non-Final Office Action dated Jun. 30, 2017, for U.S. Appl. No. 14/522,208, of Cieri, M., et al., filed Oct. 23, 2014.

Final Office Action dated Sep. 6, 2017, for U.S. Appl. No. 14/700,044, of Brock, Z., et al., filed Apr. 29, 2015.

Advisory Action dated Nov. 9, 2017, for U.S. Appl. No. 14/700,044, of Brock, Z., et al., filed Apr. 29, 2015.

Final Office Action dated Nov. 22, 2017, for U.S. Appl. No. 14/289,467, of Kumar, A., et al., filed May 28, 2014.

Final Office Action dated Nov. 24, 2017, for U.S. Appl. No. 14/522,208, of Cieri, M.M., et al., filed Oct. 23, 2014.

Non-Final Office Action dated Jan. 26, 2018, for U.S. Appl. No. 14/800,090, of Tsou, V., filed Jul. 15, 2015.

Non-Final Office Action dated Feb. 5, 2018, for U.S. Appl. No. 14/700,013, of Brock, Z., et al., filed Apr. 29, 2015.

Advisory Action dated Feb. 6, 2018, for U.S. Appl. No. 14/289,467, of Kumar, A., et al., filed May 28, 2014.

Non-Final Office Action dated Apr. 10, 2018, for U.S. Appl. No. 14/700,044, of Brock, Z., et al., filed Apr. 29, 2015.

Non-Final Office Action dated Apr. 18, 2018, for U.S. Appl. No. 14/289,467, of Kumar, A., et al., filed May 28, 2014.

Chen, F., and Samroengraja, R., "A Staggered Ordering Policy for One-Warehouse, Multiretailer Systems," Operations Research, vol. 48, Issue 2, pp. 281-293 (Apr. 1, 2000).

Cox, J.F., III, and Walker, E.D., II, "The Poker Chip Game: A Multi-product, Multi-customer, Multi-echelon, Stochastic Supply Chain Network Useful for Teaching the Impacts of Pull versus Push

(56) References Cited

OTHER PUBLICATIONS

Inventory Policies on Link and Chain Performance," INFORMS Transactions on Education, vol. 6, Issue 3, pp. 3-19 (May 1, 2006).
Ross, D.F., "Replenishment Inventory Planning," Chapter 7 of Distribution Planning and Control: Managing in the Era of Supply Chain Management, Chapman & Hall, pp. 263-319 (1996).
Wah, B.W., "Wiley Encyclopedia of Computer Science and Engineering," Wiley-Interscience, vol. 1, pp. 1-2365 (Nov. 2008).
Non-Final Office Action dated Jul. 6, 2018, for U.S. Appl. No. 14/800,021, of Tsou, V., filed Jul. 15, 2015.
Final Office Action dated Jul. 26, 2018, for U.S. Appl. No. 14/800,090, of Tsou, V., filed Jul. 15, 2015.
Non-Final Office Action dated Aug. 6, 2018, for U.S. Appl. No. 14/964,231, of Jen, M., et al., filed Dec. 9, 2015.
Final Office Action dated Aug. 15, 2018, for U.S. Appl. No. 14/700,013, of Brock, Z., et al., filed Apr. 29, 2015.
Non-Final Office Action dated Aug. 28, 2018, for U.S. Appl. No. 14/522,208, of Cieri, M.M., et al., filed Oct. 23, 2014.
Non-Final Office Action dated Sep. 14, 2018, for U.S. Appl. No. 14/964,263, of Jen, M., et al., filed Dec. 9, 2015.
Final Office Action dated Sep. 24, 2018, for U.S. Appl. No. 14/700,044, of Brock, Z., et al., filed Apr. 29, 2015.

\* cited by examiner

SMART INVENTORY TAGS

BACKGROUND

Merchants use various technologies to manage their physical inventory. For instance, a first technology can include a tag that is attached to an item in a merchant's inventory that identifies the item to aid in counting physical inventory. Merchants can use such tags to maintain a count of the number of items in the merchant's physical inventory, to determine when they need to re-order or re-stock items, to determine a geographical location of items, etc.

Additionally and/or alternatively, merchants can use a second technology, such as shelf tags, which can be useful for merchants and customers. A shelf tag can be used to denote where items should be placed within a physical store of a merchant (e.g., to maintain consistency for customers and to enable merchants and/or merchant staff to locate such items). Additionally, shelf tags can enable merchants to easily re-order items to which the shelf tags correspond. For instance, a shelf tag can display an item name and a reorder number, which can be used for re-ordering such an item. Shelf tags can be helpful to customers to determine a cost associated with particular items.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
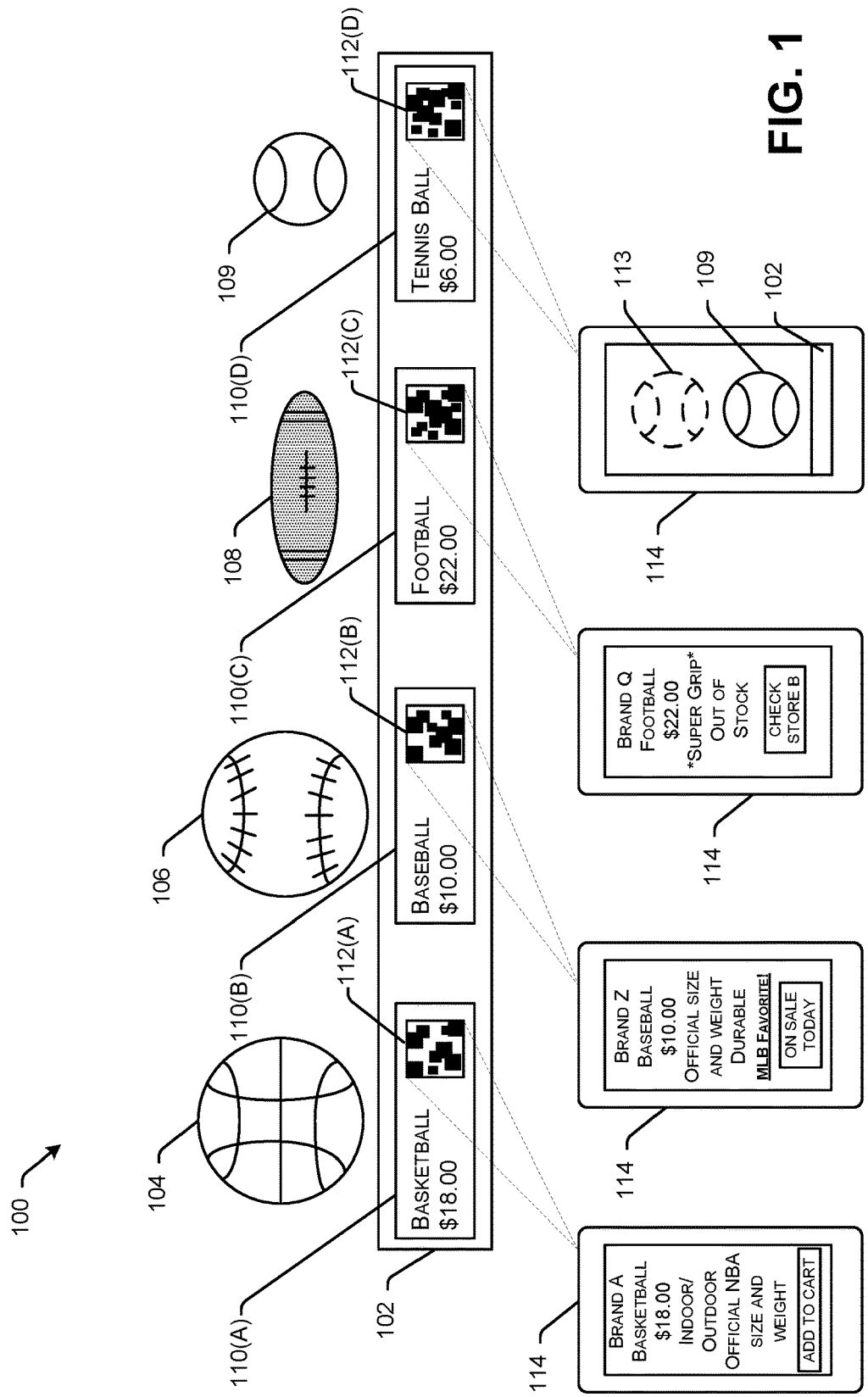
FIG. 1 illustrates an example environment in which smart inventory tags can be used to provide various capabilities to customers according to some implementations.

Techniques described herein are directed to generating and utilizing smart inventory tags. In at least one example, techniques described herein are directed to utilizing inventory data and/or merchant data associated with a merchant to enable the merchant to generate smart inventory tags for items in their inventory. For the purpose of this discussion, an inventory tag can be an apparatus that can be associated with an item either by being physically attached to the item, positioned proximate to the item or a location designated for the item (e.g., if the item is currently unavailable), etc. That is, the apparatus can be a physical marker, such as, but not limited to, a paper tag, a sticker tag, a chip tag, etc. A smart inventory tag can be an inventory tag encoded with information that provides one or more interaction capabilities to enable a customer to interact with the item in unconventional ways.

In at least one example, inventory tags described herein can be associated with encoded information (e.g., a barcode, a short-range communication tag (e.g., radio frequency identification (RFID), near-field communication (NFC), etc.), etc.) that enables one or more interaction capabilities for customers interacting with such inventory tags. For instance, a customer can interact with encoded information associated with an inventory tag corresponding to an item via a device (e.g., scan a barcode, tap a short-range communication tag, etc.) and can be presented with a user interface that enables one or more interaction capabilities. The one or more interaction capabilities can include purchasing the item on-the-spot (e.g., without going to a designated check-out location), determining a finance plan (e.g., independent of credit card financing) for purchasing the item, determining whether the item is available via an alternate source (e.g., if the item is unavailable), providing information in order to receive a notification when the item becomes available (e.g., if the item is unavailable), adding the item to a virtual shopping cart for future fulfillment (e.g., via pick-up upon check-out, shipping to a customer's home, etc.), presenting information associated with one or more additional items that are related to the item, splitting a cost of the item with another customer, sharing a virtual representation of the item with another customer and/or viewing variations of an item via an augmented reality application, presenting a notification associated with at least one of a discount, a special payment, news, or customer-specific information associated with the item, etc. In some examples, encoded information associated with an inventory tag can be associated with a single interaction capability. In other examples, encoded information associated with an inventory tag can be associated with a plurality of interaction capabilities. As described herein, the interaction capabilities can be particular to the merchant selling the item and/or a customer interacting with a particular inventory tag.

As described herein, in some examples, a merchant can generate inventory tags via a dashboard (e.g., a merchant-facing user interface that presents information associated with one or more aspects of a merchant's business) presented via a merchant computing device. In at least one example, the dashboard can be associated with a payment processing service that, among other things, can process payments on behalf of the merchant and/or enable the merchant to manage its inventory. The payment processing service can leverage information received from various interactions with a merchant, and in some examples other merchants, to determine which interaction capabilities to present to the merchant (e.g., for selection) and/or which tag design to recommend for the merchant while generating an inventory tag. Responsive to receiving a selection from the merchant, the payment processing service can encode information with the one or more interaction capabilities selected by the merchant, and can generate instructions for generating an inventory tag. The instructions can be used to inform the tag design, which can include the encoded information. In some examples, the instructions can be utilized to print the inventory tag. In other examples, the instructions can be utilized to otherwise generate the inventory tag.

In some examples, techniques described herein can be utilized to generate inventory tags for each item and/or set of items in a merchant's inventory (e.g., based on inventory data stored by the payment processing service). In at least one example, each item and/or set of items can be associated with an inventory tag having a same tag design and encoded information that provides the same interaction capabilities. In such an example, after the merchant has determined a tag design and specified the interaction capabilities, techniques described herein can generate instructions to generate inventory tags for each item and/or set of items in a merchant's inventory. In other examples, individual items or individual sets of items can be associated with particular interaction capability(s). In such examples, a merchant can specify interaction capability(s) for each item and/or set of items individually. In such examples, techniques described herein can encode information that is particular to an inventory tag for a particular item and/or set of items, which can be integrated into an inventory tag for the particular item and/or set of items. For the purpose of this discussion, inventory tags are described herein as being associated with an item; however, in at least one example, an inventory tag can be associated with an item that is representative of a set of items.

Techniques described herein introduce new capabilities to customers shopping in physical retail stores. That is, by leveraging smart inventory tags as described herein, customers can interact with items in ways that have not previously been available to customers shopping in physical retail stores and/or are otherwise unconventional in physical retail store environments. For instance, existing technologies do not enable customers to receive real-time relevant information and/or capabilities such to enhance their in-store shopping experiences. Furthermore, existing technologies do not permit customers that are not physically located in a same physical retail store to participate in in-store shopping experiences. As such, techniques described herein introduce an improvement to existing inventory tag technology.

FIG. 1 illustrates an example environment 100 in which smart inventory tags can be used to provide various capabilities to customers. FIG. 1 depicts a shelf 102 in which one or more balls are placed and/or are to be placed. For instance, the shelf 102 can include a basketball 104, a baseball 106, a football 108, and a tennis ball 109. As illustrated, the football 108 is out of stock (as shown by the shaded representation), or is otherwise unavailable. The shelf 102 can be associated with a physical store of a merchant, which can offer one or more items for acquisition (e.g., sale, lease, trade, borrow, etc.). Each item (e.g., the basketball 104, the baseball 106, the football 108, and the tennis ball 109) can be associated with an inventory tag 110(A)-110(D), respectively. Each inventory tag can identify an item and include encoded information (e.g., 112(A)-112(D)). Inventory tags can include additional and/or alternative information as well. For instance, inventory tags can include a logo associated with the merchant, an image of a corresponding item, a cost of the corresponding item, a cost per unit of the corresponding item, an inventory identification number associated with the corresponding item, a restocking number for re-ordering a corresponding item, etc. As an example, inventory tag 110A identifies the item to which it corresponds (e.g., a basketball), includes a cost of the item, and includes encoded information 112(A) associated with the item. The encoded information can be a barcode (e.g., one-dimensional, two-dimensional, etc.), a short-range communication tag (e.g., RFID, NFC, etc.), etc.

In at least one example, a customer can utilize a device 114 to interact with the inventory tag(s) 110(A)-110(D). For instance, the device 114 can include a sensor or other input/output device (e.g., a short-range communication tag reader, a camera, etc.) which can be utilized to interact with the inventory tag(s) 110(A)-110(D). In some examples, the device 114 can be a device that is personal to the customer (e.g., the customer brings the device 114 into the physical store). In other examples, the device 114 can be a device provisioned by the merchant. In at least one example, the device 114 can be a component of a point-of-sale (POS) system of the merchant.

The device 114 can interact with the encoded information, such as the encoded information 112(A), and, based on the device 114 interacting with the encoded information 112(A), one or more interaction capabilities can be availed to the customer. For instance, responsive to the device 114 interacting with the encoded information 112(A), the customer can receive additional information associated with the basketball 104 and/or be presented with an option to add the basketball 104 to a virtual shopping cart so that the customer can receive the basketball 104 at a future time (e.g., at check-out with one or more other items, via delivery to the customer's home, etc.).

As an additional and/or alternative example, responsive to the device 114 interacting with the encoded information 112(B), the customer can receive additional information associated with the baseball 106 and/or can be presented with a notification that the baseball 106 is on sale. In additional and/or alternative examples, the notification can indicate that the baseball 106 qualifies for special pricing and/or can be associated with news, customer-specific information, etc.

As an additional and/or alternative example, responsive to the device 114 interacting with the encoded information 112(C), the customer can receive additional information associated with the football 108 and/or can be presented with an option to check the availability of the football 108 via an alternate source. In some examples, the alternate source can be another physical store of the merchant, an online store of the merchant, a physical store of another merchant, an online store of another merchant, etc. Additionally and/or alternatively, the customer can receive an option to input contact information for being contacted when the football 108 becomes available, if the encoded information 112(C) is encoded with such an interaction capability.

Furthermore, in at least one example, responsive to the device 114 interacting with the encoded information 112(D), the customer can view an image of the tennis ball 109 (e.g., on the shelf 102) and a virtual representation of another tennis ball 113 (e.g., as shown in dashed lines). That is, the customer can view one or more additional and/or alternative items via an augmented reality application associated with the device 114. In at least one example, the other tennis ball 113 can represent another variation (e.g., brand, color, size, etc.) of a tennis ball that the merchant has available in its inventory (or in an inventory of another merchant). Accordingly, based on the device 114 interacting with the encoded information 112(D), the customer can compare the virtual alternate version of the item (e.g., tennis ball 113) alongside the physical (real) version of the item (e.g., tennis ball 109) using augmented reality.

FIG. 1 is but one example of how inventory tags can be used to provide various interaction capabilities to customers. As described above, each inventory tag can be associated with one or more interaction capabilities, depending on which interaction capabilities are selected by the merchant, for example. While the description above is directed to shelf inventory tags, which can be associated with a set of items (e.g., one or more items of a same type of item), in additional and/or alternative examples, such encoded information can be associated with an inventory tag that is attached to an individual item and/or another display device (e.g., a table, a clothing rack, etc.). In such examples, a customer can interact with the inventory tag attached to an item in a same or similar manner as the customer interacts with a shelf inventory tag such to enable access to various interaction capabilities.

As described above, in some examples, the interaction capabilities can be determined based on merchant selection from one or more interaction capabilities presented to a merchant. Additionally and/or alternatively, in at least one example, the interaction capabilities and/or displayed augmented reality elements for a particular item may be specific for a certain customer based on the purchase behavior associated with the customer. For example, though the merchant may enable a specific set of interaction capabilities (e.g., display alternate sizes and colors in augmented reality, enable add to virtual cart, check availability of an item additional stores, etc.), a payment processing service can determine that the customer only purchases one particular size or prefers a certain color, and would therefore surface the most relevant inventory and/or options for the particular user. In this way, two customers may interact with the same item tag and see different information and interaction capabilities.

Figure 2:
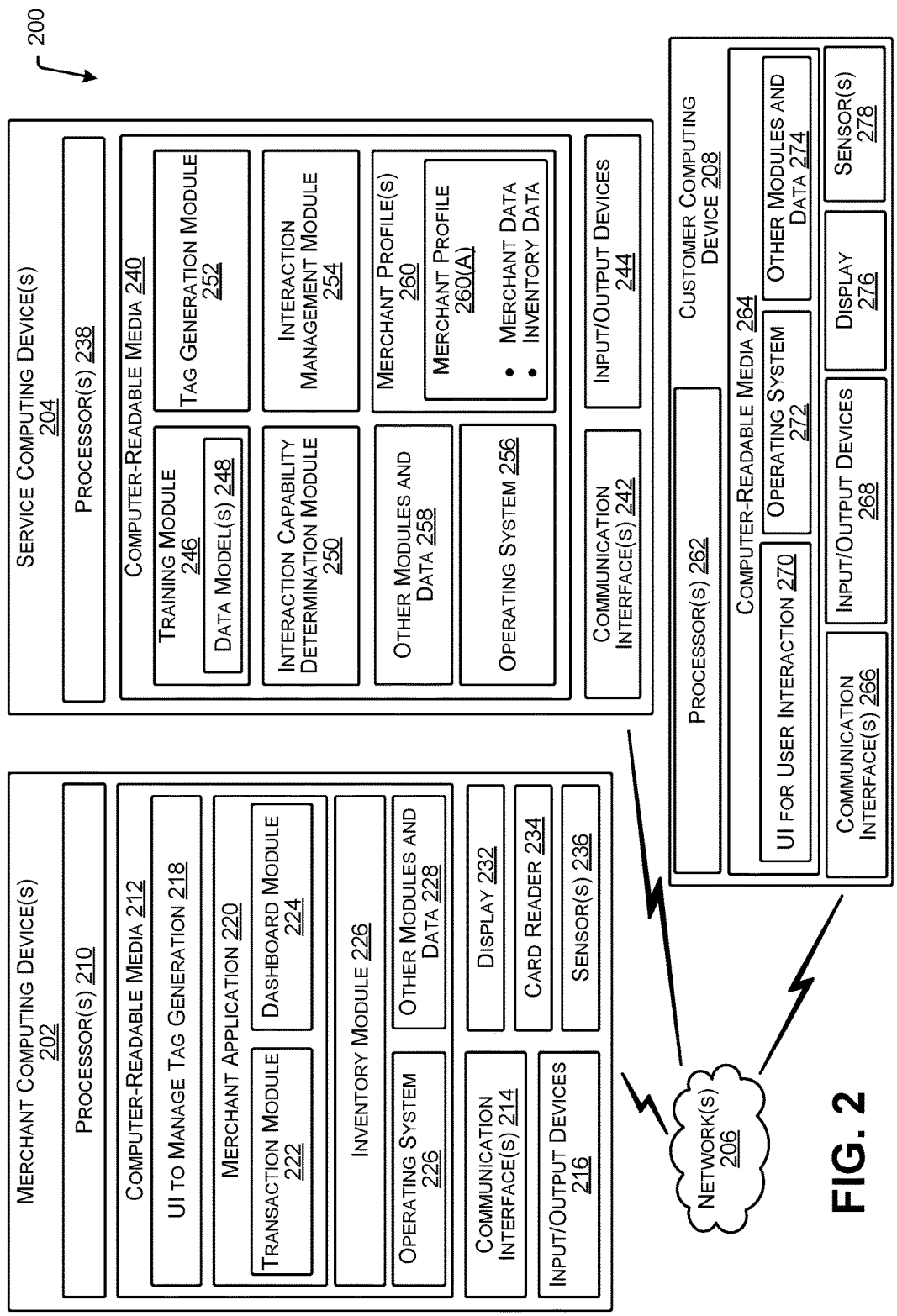
FIG. 2 illustrates an example system for generating smart inventory tags and facilitating interactions associated with capabilities of the smart inventory tags according to some implementations.

FIG. 2 illustrates an example system 200 for generating smart inventory tags and facilitating interactions associated with capabilities of the smart inventory tags. The system 200 includes merchant computing device(s) 202 (operated by merchant(s)) that communicate with service computing device(s) 204 (which can be associated with a service provider such as a payment processing service) via network(s) 206 (e.g., the Internet, cable network(s), cellular network(s), wireless network(s) (e.g., Wi-Fi) and wired network(s), as well as short-range communications such as NFC, Bluetooth®, Bluetooth® low energy, and the like). In at least one example, the system 200 can include a customer computing device 208. The customer computing device 208 can correspond to the device 114 described above with reference to FIG. 1.

In at least one example, the merchant computing device(s) 202 can be any suitable type of computing device, e.g., portable, semi-portable, semi-stationary, or stationary. Some examples of the merchant computing device(s) 202 can include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; augmented reality devices; or other computing devices capable of sending communications and performing the functions according to the techniques described herein.

In the illustrated example, the merchant computing device(s) 202 include one or more processors 210, one or more computer-readable media 212, one or more communication interface(s) 214, and one or more input/output (I/O) devices 216. Each processor 210 can itself comprise one or more processors or processing cores. For example, the processor(s) 210 can be implemented as one or more microprocessors, microcomputers, microcontrollers, digital signal processors, central processing units, state machines, logic circuitries, and/or any devices that manipulate signals based on operational instructions. In some examples, the processor(s) 210 can be one or more hardware processors and/or logic circuits of any suitable type specifically programmed or configured to execute the algorithms and processes described herein. The processor(s) 210 can be configured to fetch and execute computer-readable processor-executable instructions stored in the computer-readable media 212.

Depending on the configuration of the merchant computing device(s) 202, the computer-readable media 212 can be an example of tangible non-transitory computer storage media and can include volatile and nonvolatile memory and/or removable and non-removable media implemented in any type of technology for storage of information such as computer-readable processor-executable instructions, data structures, program modules or other data. The computer-readable media 212 can include, but is not limited to, RAM, ROM, EEPROM, flash memory, solid-state storage, magnetic disk storage, optical storage, and/or other computer-readable media technology. Further, in some examples, the merchant computing device(s) 202 can access external storage, such as RAID storage systems, storage arrays, network attached storage, storage area networks, cloud storage, or any other medium that can be used to store information and that can be accessed by the processor(s) 210 directly or through another computing device or network. Accordingly, the computer-readable media 212 can be computer storage media able to store instructions, modules or components that can be executed by the processor(s) 210. Further, when mentioned, non-transitory computer-readable media exclude media such as energy, carrier signals, electromagnetic waves, and signals per se.

The computer-readable media 212 can be used to store and maintain any number of functional components that are executable by the processor(s) 210. In some implementations, these functional components comprise instructions or programs that are executable by the processor(s) 210 and that, when executed, implement operational logic for performing the actions and services attributed above to the merchant computing device(s) 202. Functional components stored in the computer-readable media 212 can include a user interface (UI) to manage tag generation 218, a merchant application 220, which can include a transaction module 222 and a dashboard module 224, and an inventory application 226.

The UI to manage tag generation 218 can be configured to, among other things, enable a merchant to design and/or generate inventory tags via the merchant computing device(s) 202. In at least one example, the UI to manage tag generation 218 can receive information from the service computing device(s) 204 that the UI to manage tag generation 218 can utilize to present a via a user interface to a merchant. In at least one example, such a user interface can include elements representative of one or more interaction capabilities. In some examples, such elements can be presented responsive to a request, made by the merchant via the UI to manage tag generation 218, to generate at least one inventory tag for at least one item. A merchant can select one or more of the interaction capabilities to associate with one or more inventory tags. In some examples, each inventory tag associated with a merchant can have the same interaction capability(s). That is, all inventory tags associated with the merchant's items can be associated with the same interaction capability(s). In other examples, the merchant can select interaction capability(s) for individual inventory tags (which can be associated with individual items). That is, some inventory tags can have more or fewer interaction capability(s) than other individual inventory tags. While it is described herein that inventory tags are encoded with interaction capability(s) pursuant to merchant selections, in additional and/or alternative examples, inventory tags can be encoded with standard and/or default interaction capability(s), or interaction capability(s) that are determined by the service computing device(s) 204 in an alternative manner than via merchant selection.

In at least one example, the UI to manage tag generation 218 can enable a merchant to determine a design for one or more inventory tags. In at least one example, the service computing device(s) 204 can send data associated with at least one tag design recommendation. In some examples, a merchant can confirm selection of a recommended tag design. In at least one example, the recommended tag design(s) can be pre-populated with information associated with an item, which can be obtained from inventory data and/or merchant data stored by the service computing device(s) 204. In additional and/or alternative examples, the recommended tag design(s) may require the merchant to input data to complete the tag design(s). For instance, the merchant can input a logo, an image of an item, and/or additional or alternative information. In other examples, a merchant can provide its own design for the inventory tag. That is, the merchant can choose design elements and/or information that are to be associated with one or more inventory tags.

In some examples, based at least in part on determining that a merchant selects one or more interaction capabilities and/or a design, the UI to manage tag generation 218 can send an indication of the merchant's selections to the service computing device(s) 204. As described below, the service computing device(s) 204 can generate instructions to facilitate generating an inventory tag based on the merchant's selections. In at least one example, the service computing device(s) 204 can generate the inventory tag utilizing the instructions and can send, or otherwise provide, the inventory tag to the merchant. In an additional and/or alternative example, the service computing device(s) 204 can send the instructions to facilitate generating an inventory tag back to the merchant computing device(s) 202, and the merchant computing device(s) 202 can leverage the instructions to generate an inventory tag. For instance, the UI to manage tag generation 218 can receive the instructions and can leverage the instructions to print the inventory tag via an input/output device 216 associated with the merchant computing device(s) 202. In some examples, the service computing device(s) 204 can send the instructions to facilitate generating an inventory tag to a third-party source and/or system (e.g., a printing company, etc.), and the third-party source and/or system can leverage the instructions to generate an inventory tag.

The merchant application 220 can provide POS functionality to the merchant computing device(s) 202 to enable the merchant to accept payments from one or more customers at a POS location. For example, the merchant can use the merchant computing device(s) 202 to accept payments through various different types of payment instruments, e.g., payment cards, electronic payment, cash or check, at the POS location from the one or more customers. In at least one example, the transaction module 222 can present various user interfaces to enable a merchant to conduct transactions, receive payments, and so forth. Further, the dashboard module 224 can enable the merchant to manage transactions, payments, and so forth, via a dashboard. For the purpose of this discussion, a dashboard can be a user interface that provides an at-a-glance view of key information associated with, among other things, the merchant's business (e.g., associated with transactions, payments, inventory, etc.). That is, a dashboard can be a merchant-facing user interface that enables the merchant to view information and/or control one or more operations associated with the merchant's business. In some examples, the UI to manage tag generation 218 can be accessible via a dashboard presented by the dashboard module 224.

The inventory application 226 can enable a merchant to generate and/or maintain an inventory. In at least one example, the inventory application 226 can present various user interfaces to enable the merchant to access and manage a database storing inventory data associated with items that the merchant has available for acquisition (i.e., an inventory). In at least one example, as described below, the inventory data may include a plurality of data items and a data item of the plurality of data items may represent an item that the merchant has available for acquisition. The data item may identify the item and may be associated with additional data that represents information about the item. For instance, the additional data may include attribute(s) of the item, a cost of the item, a discount available for the item, taxes applicable to the item, finance plans available for the item, the availability of the item (e.g., how many of the same item are available), a location of the item, image(s) of the item, three-dimensional model(s) of the item, news associated with the item, etc. Additional details associated with the inventory data are described below. The inventory data can be accessible via one or more access points. As a non-limiting example, the inventory data can be accessible via a web interface, a user interface, an application, etc. that can be presented via the inventory application 226.

Furthermore, the computer-readable media 212 can include additional functional components, such as an operating system 228 for controlling and managing various functions of the merchant computing device(s) 202 and for enabling basic user interactions. In addition, the computer-readable media 212 can also store data, data structures and the like, that are used by the functional components. Depending on the type of the merchant computing device(s) 202, the computer-readable media 212 can also optionally include other functional components and data, such as other modules and data 230, which can include programs, drivers, etc., and the data used or generated by the functional components. For instance, in some examples, the merchant computing device(s) 202 can include a payroll module, an employee management module, a financing module, an appointment module, etc., which can facilitate payroll services, employee management services, financing services, appointment services, etc., respectively. Further, the merchant computing device(s) 202 can include many other logical, programmatic and physical components, of which those described are merely examples that are related to the discussion herein.

The communication interface(s) 214 can include one or more interfaces and hardware components for enabling communication with various other devices, such as over the network(s) 206 or directly. For example, communication interface(s) 214 can enable communication through one or more of the Internet, cable networks, cellular networks, wireless networks (e.g., Wi-Fi) and wired networks, as well as short-range communications such as NFC, Bluetooth®, Bluetooth® low energy, and the like, as additionally enumerated elsewhere herein.

The merchant computing device(s) 202 can further include the one or more I/O devices 216. The I/O devices 216 can include speakers, a microphone, a camera, a projector, and various user controls (e.g., buttons, a joystick, a keyboard, a keypad, etc.), a haptic output device, and so forth. In some examples, the I/O devices 216 can include a printer or other device for inventory tag generation.

In at least one example, merchant computing device(s) 202 can include a display 232. Depending on the type of computing device(s) used as the merchant computing device(s) 202, the display 232 can employ any suitable display technology. For example, the display 232 can be a liquid crystal display, a plasma display, a light emitting diode display, an OLED (organic light-emitting diode) display, an electronic paper display, or any other suitable type of display able to present digital content thereon. In some examples, the display 232 can have a touch sensor associated with the display 232 to provide a touchscreen display configured to receive touch inputs for enabling interaction with a graphic interface presented on the display 232. Accordingly, implementations herein are not limited to any particular display technology. In some examples, the merchant computing device(s) 202 can include multiple displays and, in other examples, the merchant computing device(s) 202 may not include any displays, and information can be presented by other means, such as aurally, via a projection onto another surface, etc.

In addition, in some examples, the merchant computing device(s) 202 can include or can be connectable to a card reader 234. In some examples, the card reader 234 can plug in to a port in the merchant computing device(s) 202, such as a microphone/headphone port, a data port, or other suitable port. The card reader 234 can include a read head for reading a magnetic strip of a payment card, and further can include encryption technology for encrypting the information read from the magnetic strip. Alternatively, numerous other types of card readers can be employed with the merchant computing device(s) 202 herein, depending on the type and configuration of the merchant computing device(s) 202. In some examples, a customer computing device 208 can include a card reader instead of, or in addition to, the merchant computing device 202.

Other components included in the merchant computing device(s) 202 can include one or more sensors 236, such as an accelerometer, gyroscope, compass, proximity sensor, camera, microphone, a switch, a global positioning system (GPS), etc. Additionally, the merchant computing device(s) 202 can include various other components that are not shown, examples of which include removable storage, a power source, such as a battery and power control unit, a barcode scanner, a cash drawer, and so forth.

In at least one example, the service computing device(s) 204 can be associated with a service provider, which can be a payment processing service. The service computing device(s) 204 can include one or more servers or other types of computing devices that can be embodied in any number of ways. For example, in the example of a server, the modules, other functional components, and data can be implemented on a single server, a cluster of servers, a server farm or data center, a cloud-hosted computing service, a cloud-hosted storage service, and so forth, although other computer architectures can additionally or alternatively be used.

Further, while the figures illustrate the components and data of the service computing device(s) 204 as being present in a single location, these components and data can alternatively be distributed across different computing devices and different locations in any manner. Consequently, the functions can be implemented by one or more service computing devices, with the various functionality described above distributed in various ways across the different computing devices. Multiple service computing device(s) 204 can be located together or separately, and organized, for example, as virtual servers, server banks and/or server farms. The described functionality can be provided by the servers of a single entity or enterprise, or can be provided by the servers and/or services of multiple different customers or enterprises.

In the illustrated example, the service computing device(s) 204 can include one or more processors 238, one or more computer-readable media 240, one or more communication interfaces 242, and one or more input/output devices 244. Each processor 238 can be a single processing unit or a number of processing units, and can include single or multiple computing units or multiple processing cores. The processor(s) 238 can be implemented as one or more microprocessors, microcomputers, microcontrollers, digital signal processors, central processing units, state machines, logic circuitries, and/or any devices that manipulate signals based on operational instructions. For example, the processor(s) 238 can be one or more hardware processors and/or logic circuits of any suitable type specifically programmed or configured to execute the algorithms and processes described herein. The processor(s) 238 can be configured to fetch and execute computer-readable instructions stored in the computer-readable media 240, which can program the processor(s) 238 to perform the functions described herein.

The computer-readable media 240 can include volatile and nonvolatile memory and/or removable and non-removable media implemented in any type of technology for storage of information, such as computer-readable instructions, data structures, program modules, or other data. Such computer-readable media 240 can include, but is not limited to, RAM, ROM, EEPROM, flash memory or other memory technology, optical storage, solid state storage, magnetic tape, magnetic disk storage, RAID storage systems, storage arrays, network attached storage, storage area networks, cloud storage, or any other medium that can be used to store the desired information and that can be accessed by a computing device. Depending on the configuration of the service computing device(s) 204, the computer-readable media 240 can be a type of computer-readable storage media and/or can be a tangible non-transitory media to the extent that when mentioned, non-transitory computer-readable media exclude media such as energy, carrier signals, electromagnetic waves, and signals per se.

The computer-readable media 240 can be used to store any number of functional components that are executable by the processor(s) 238. In many implementations, these functional components comprise instructions or programs that are executable by the processor(s) 238 and that, when executed, specifically configure the one or more processors 238 to perform the actions attributed above to the service provider and/or payment processing service. Functional components stored in the computer-readable media 240 can include a training module 246, that can store one or more data models 248, an interaction capability determination module 250, a tag generation module 252, and an interaction management module 254.

The training module 240 can train one or more data models 248 via machine learning mechanisms. The one or more data models 248 can be used to determine (i) one or more interaction capabilities to present to a merchant and/or (ii) one or more recommended tag designs for the merchant. In at least one example, the training module 240 can utilize a machine learning mechanism to build, modify, or otherwise utilize a data model that is created from example inputs and analyzes data to make predictions or decisions. In some examples, one or more of the data model(s) 248 can be specific to a particular merchant (e.g., trained on merchant data and/or inventory data associated with the particular merchant), a cohort of merchants (e.g., trained on merchant data and/or inventory data associated with a plurality of merchants that share at least one characteristic), or a general population of merchants (e.g., trained on merchant data and/or inventory data associated with a plurality of merchants that may or may not share one or more characteristics). Additional details associated with training the one or more data models 248 are described below with reference to FIGS. 3 and 4. In at least one example, the one or more data models 248 can be stored in the training module 246 for subsequent use.

The interaction capability determination module 250 can determine one or more interaction capabilities to present to a merchant (e.g., for selection). In some examples, the interaction capability determination module 250 can determine the one or more interaction capabilities responsive to receiving a request from the merchant computing device(s) 202 to generate at least one inventory tag. In at least one example, the interaction capability determination module 250 can utilize a data model of the one or more data models 248 to determine which interaction capabilities to present to a merchant. In some examples, one or more of the interaction capabilities may not be relevant for a particular merchant. For instance, in at least one example, a financing option associated with an interaction capability may not make sense for a merchant that sells coffee at a coffee shop. In at least one example, the interaction capability determination module 250 can access merchant data and/or inventory data associated with a merchant (e.g., from a merchant profile of the merchant profile(s)) and can analyze the merchant data and/or the inventory data utilizing the one or more data models 248. The one or more data models 248 can output one or more interaction capabilities to present to a merchant. In some examples, the output can be particular to the merchant, can be associated with one or more other merchants that share at least one characteristic (e.g., merchant category classification (MCC), geolocation, etc.) with the merchant, or can be associated with a general population of merchants, depending on which data model of the one or more data models 248 is used by the interaction capability determination module 250.

The tag generation module 252 can facilitate the generation of inventory tags. In at least one example, the tag generation module 252 can receive, from the interaction capability determination module 250, one or more interaction capabilities for presenting to a merchant. Furthermore, in at least one example, the tag generation module 252 can determine at least one recommended tag design. In such an example, the tag generation module 252 can utilize the one or more data models 248 to analyze merchant data and/or inventory data associated with the merchant to output at least one recommended tag design. In some examples, the output can be particular to the merchant, can be associated with one or more other merchants that share at least one characteristic (e.g., MCC, geolocation, etc.) with the merchant, or can be associated with a general population of merchants, depending on which data model of the one or more data models 248 is used by the tag generation module 252.

The tag generation module 252 can send an indication to the merchant computing device(s) 202 that is associated with one or more interaction capabilities that are to be presented to the merchant and/or the at least one recommended tag design that is to be presented to the merchant. In at least one example, responsive to receiving a selection of one or more interaction capabilities, the tag generation module 252 can generate encoded information that is to be associated with an inventory tag. That is, the tag generation module 252 can encode a barcode, a short-range communication tag, etc. with data such that when a customer computing device (e.g., customer computing device 208) interacts with the barcode, the short-range communication tag, etc., a user interface can be presented to the customer to avail the one or more interaction capabilities to the customer. For instance, in at least one example, the tag generation module 252 can associate data corresponding to a particular interaction capability with a barcode, short-range communication tag, etc. Additionally, the tag generation module 252 can receive an indication of an acceptance of a recommended tag design and/or information regarding a tag design. In at least one example, the tag generation module 252 can generate instructions for generating one or more inventory tags based on the selected interaction capability(s) and/or the tag design. The instructions can inform the production of one or more inventory tags, for instance regarding the encoded information and/or a tag design for the one or more inventory tags.

In at least one example, the tag generation module 252 can send the instructions to another component of the service computing device(s) 204 (e.g., input/output devices 244) and the other component can generate the one or more inventory tags utilizing the instructions. For instance, the other component can print the one or more inventory tags based on the instructions. In such an example, the payment processing service can send, or otherwise provide, the one or more inventory tags to the merchant. In an additional and/or alternative example, the tag generation module 252 can send the instructions to facilitate generating one or more inventory tags back to the merchant computing device(s) 202, and the merchant computing device(s) 202 can leverage the instructions to generate the one or more inventory tags. In some examples, the tag generation module 252 can send the instructions to facilitate generating one or more inventory tags to a third-party source and/or system (e.g., a printing company, etc.), and the third-party source and/or system can leverage the instructions to generate the one or more inventory tags. In such an example, the third-party source and/or system can send, or otherwise provide, the one or more inventory tags to the merchant.

Additional details associated with inventory tag generation are described below with reference to FIG. 5.

The interaction management module 254 can facilitate interactions associated with the one or more interaction capabilities. As described above, the one or more interaction capabilities can include purchasing the item on-the-spot (e.g., without going to a designated check-out location), determining a finance plan (e.g., independent of credit card financing) for purchasing an item, determining whether an item is available via an alternate source (e.g., if the item is unavailable), providing information in order to receive a notification when an item becomes available (e.g., if the item is unavailable), adding an item to a virtual shopping cart for future fulfillment (e.g., via pick-up upon check-out, shipping to a customer's home, etc.), presenting information associated with one or more additional items that are related to an item, splitting a cost of an item with another customer, sharing a virtual representation of an item with another customer and/or viewing variations of an item via an augmented reality application, presenting a notification associated with at least one of a discount, a special payment, news, or customer-specific information associated with an item, etc.

In at least one example, the interaction management module 254 can receive an indication that a customer computing device (e.g., customer computing device 208) interacted with encoded information associated with an inventory tag. Based at least in part on receiving such an indication, the interaction management module 254 can cause a user interface to be presented via the customer computing device 208 to facilitate one or more interactions associated with one or more interaction capabilities associated with the encoded information. In some examples, the interaction management module 254 can modify which interaction capabilities of the one or more interaction capabilities are presented based on customer-specific data associated with the customer interacting with the inventory tag. Based on receiving indication(s) indicating how the customer interacts with the user interface, the interaction management module 254 can perform one or more actions to facilitate one or more interactions corresponding to the one or more interaction capabilities associated with the encoded information. In at least one example, the interaction management module 254 can utilize one or more other modules and data 256 associated with the service computing device(s) 204 to facilitate the one or more interactions. Furthermore, in some examples, the interaction management module 254 can utilize other modules and data associated with the merchant computing device(s) 202 to facilitate the one or more interactions. Various examples of such interactions are provided below with respect to FIG. 6.

In at least one example, the computer-readable media 240 can include or maintain other functional components and data, such as other modules and data 256, which can include programs, drivers, etc., and the data used or generated by the functional components. Further, the service computing device(s) 204 can include many other logical, programmatic and physical components, of which those described above are merely examples that are related to the discussion herein.

Additional functional components stored in the computer-readable media 240 can include an operating system 258 for controlling and managing various functions of the service computing device(s) 204.

In addition, the computer-readable media 240 can store data used for performing the operations described herein. Thus, the computer-readable media 240 can store merchant profile(s) 260. In at least one example, the merchant profile(s) 260 can store information associated with individual merchant(s). For instance, a merchant profile 260(A) of the merchant profile(s) 260 can store merchant data including, but not limited to, a MCC, geographic location(s) of physical store(s) of the merchant, transaction data associated with transactions conducted by the merchant (e.g., via the merchant application 220), hardware (e.g., device type) used by the merchant, etc. In some examples, the merchant data can include indication(s) of interaction capability(s) previously used by a merchant in association with inventory tag(s) and/or tag design(s) previously used by a merchant in association with inventory tag(s).

Additionally, the merchant profile(s) 260 can store inventory data associated with inventories of merchants. For instance, the merchant profile 260(A) can store inventory data, which may include a plurality of data items and a data item of the plurality of data items may represent an item that the entity has available for acquisition. The data item may identify the item and may be associated with additional data that represents information about the item. For instance, the additional data may include attribute(s) of the item, a cost of the item, a discount available for the item, taxes applicable to the item, finance plans available for the item, the availability of the item (e.g., how many of the same item are available), a location of the item, image(s) of the item, three-dimensional model(s) of the item, news associated with the item, etc. In at least one example, attribute(s) may correspond to variants of the item and may be represented by attribute values. A creator of an inventory data may arbitrarily specify attribute names and allowed values for each of the attributes, dependent on the actual characteristics of an item. For instance, attribute names may include "color" and "size" and attribute values may include "red" or "green" or "small," "medium," or "large," for each attribute name, respectively.

The inventory data can be updated following an inventory data activity (i.e., where entities associated with the entity manually determine quantities of each of the items that the entity has available), upon receiving new item(s) that are to be offered for acquisition, after item(s) are acquired by customers, etc. In additional and/or alternative examples, the inventory data can be updated based on information received from the merchant (e.g., via the merchant computing device(s) 202) and/or other sources and/or systems. For instance, in some examples, the payment processing service may track individual instances of an item as the instance moves through entity(s) associated with a product supply chain.

The communication interface(s) 242 can include one or more interfaces and hardware components for enabling communication with various other devices, such as over the network(s) 206. For example, communication interface(s) 242 can enable communication through one or more of the Internet, cable networks, cellular networks, wireless networks (e.g., Wi-Fi) and wired networks, as well as short-range communications such as NFC, Bluetooth®, Bluetooth® low energy, and the like, as additionally enumerated elsewhere herein.

The service computing device(s) 204 can further be equipped with various input/output (I/O) devices 242. Such I/O devices 244 can include a display, various user interface controls (e.g., buttons, joystick, keyboard, mouse, touch screen, etc.), audio speakers, connection ports and so forth.

In at least one example, the system 200 can include the customer computing device 208. The customer computing device 208 can be any suitable type of computing device, e.g., portable, semi-portable, semi-stationary, or stationary. Some examples of the customer computing device 208 can include tablet computing devices; smart phones and mobile communication devices; laptops, netbooks and other portable computers or semi-portable computers; desktop computing devices, terminal computing devices and other semi-stationary or stationary computing devices; dedicated register devices; wearable computing devices, or other body-mounted computing devices; augmented reality devices; or other computing devices capable of sending communications and performing the functions according to the techniques described herein.

In some examples, the merchant computing device(s) 202 and the customer computing device 208 can be associated with a POS system. In such examples, the merchant computing device(s) 202 can facilitate merchant operations and the customer computing device 208 can facilitate customer operations. Furthermore, in some examples, the display 232 associated with the merchant computing device(s) 202 can be associated with merchant-facing information and a display associated with the customer computing device 208, described below, can be associated with customer-facing information. In some examples, the customer computing device 208 can include one or more components associated with the merchant computing device(s) 202 (e.g., a card reader, etc.) instead of, or in addition to, the one or more components associated with the merchant computing device(s) 202. Furthermore, in some examples, the merchant computing device(s) 202 and the customer computing device 208 can communicate via a wired or wireless communication such to share information.

In the illustrated example, the customer computing device 208 includes one or more processors 262, one or more computer-readable media 264, one or more communication interface(s) 266, and one or more input/output (I/O) devices 268. Each processor 262 can itself comprise one or more processors or processing cores. For example, the processor(s) 262 can be implemented as one or more microprocessors, microcomputers, microcontrollers, digital signal processors, central processing units, state machines, logic circuitries, and/or any devices that manipulate signals based on operational instructions. In some examples, the processor(s) 262 can be one or more hardware processors and/or logic circuits of any suitable type specifically programmed or configured to execute the algorithms and processes described herein. The processor(s) 262 can be configured to fetch and execute computer-readable processor-executable instructions stored in the computer-readable media 264.

Depending on the configuration of the customer computing device 208, the computer-readable media 264 can be an example of tangible non-transitory computer storage media and can include volatile and nonvolatile memory and/or removable and non-removable media implemented in any type of technology for storage of information such as computer-readable processor-executable instructions, data structures, program modules or other data. The computer-readable media 264 can include, but is not limited to, RAM, ROM, EEPROM, flash memory, solid-state storage, magnetic disk storage, optical storage, and/or other computer-readable media technology. Further, in some examples, the customer computing device 208 can access external storage, such as RAID storage systems, storage arrays, network attached storage, storage area networks, cloud storage, or any other medium that can be used to store information and that can be accessed by the processor(s) 262 directly or through another computing device or network. Accordingly, the computer-readable media 264 can be computer storage media able to store instructions, modules or components that can be executed by the processor(s) 262. Further, when mentioned, non-transitory computer-readable media exclude media such as energy, carrier signals, electromagnetic waves, and signals per se.

The computer-readable media 264 can be used to store and maintain any number of functional components that are executable by the processor(s) 262. In some implementations, these functional components comprise instructions or programs that are executable by the processor(s) 262 and that, when executed, implement operational logic for performing the actions and services attributed above to the customer computing device 208. Functional components stored in the computer-readable media 264 can include a user interface (UI) for user interaction 270. In some examples, the UI for user interaction 270 can be presented via a web browser, an application, etc. In some examples, the UI for user interaction 270 can be temporarily provisioned to the customer computing device 208 (e.g., in an example where the customer computing device 208 is personal to the customer). In at least one example, the UI for user interaction 270 can be associated with a customer identifier associated with the customer.

The UI for user interaction 270 can be configured to present a user interface responsive to an interaction between the customer computing device 208 and the encoded information of inventory tag(s). In at least one example, the UI for user interaction 270 can receive instructions for presenting the user interface from the service computing device(s) 204. In other examples, the UI for user interaction 270 can receive instructions for presenting the user interface from the encoded information of the inventory tag(s). As described above, the user interface presented by the UI for user interaction 270 can enable one or more interactions associated with one or more interaction capabilities associated with encoded information of an inventory tag. In at least one example, the user interface can include an element representative of each interaction capability associated with the encoded information of an inventory tag. The UI for user interaction 270 can determine which element the customer interacts with and can present information associated with the respective interaction capability.

Various interaction capabilities are described above. In at least one example, the UI for user interaction 270 can determine which interaction capability the customer interacts with and can send an indication to the service computing device(s) 204, as described above. Based on receiving indication(s) regarding how the customer interacts with the user interface, the service computing device(s) 204 can perform one or more actions to facilitate one or more interactions corresponding to the one or more interaction capabilities associated with the encoded information. In at least one example, the service computing device(s) 204 can exchange data with the UI for user interaction 270 to facilitate the one or more interactions via the user interface. Various examples are provided below with respect to FIG. 6.

Furthermore, the computer-readable media 264 can include additional functional components, such as an operating system 272 for controlling and managing various functions of the customer computing device 208 and for enabling basic user interactions. In addition, the computer-readable media 264 can also store data, data structures and the like, that are used by the functional components. Depending on the type of the customer computing device 208, the computer-readable media 264 can also optionally include other functional components and data, such as other modules and data 274, which can include programs, drivers, etc., and the data used or generated by the functional components. Further, the customer computing device 208 can include many other logical, programmatic and physical components, of which those described are merely examples that are related to the discussion herein.

The communication interface(s) 266 can include one or more interfaces and hardware components for enabling communication with various other devices, such as over the network(s) 206 or directly. For example, communication interface(s) 266 can enable communication through one or more of the Internet, cable networks, cellular networks, wireless networks (e.g., Wi-Fi) and wired networks, as well as short-range communications such as NFC, Bluetooth®, Bluetooth® low energy, and the like, as additionally enumerated elsewhere herein.

The customer computing device 208 can further include the one or more I/O devices 268. The I/O devices 268 can include speakers, a microphone, a camera, a projector, a short-range communication tag reader, and various user controls (e.g., buttons, a joystick, a keyboard, a keypad, etc.), a haptic output device, and so forth.

In at least one example, customer computing device 208 can include a display 276. Depending on the type of computing device(s) used as the customer computing device 208, the display 276 can employ any suitable display technology. For example, the display 276 can be a liquid crystal display, a plasma display, a light emitting diode display, an OLED (organic light-emitting diode) display, an electronic paper display, or any other suitable type of display able to present digital content thereon. In some examples, the display 276 can have a touch sensor associated with the display 276 to provide a touchscreen display configured to receive touch inputs for enabling interaction with a graphic interface presented on the display 276. Accordingly, implementations herein are not limited to any particular display technology. Alternatively, in some examples, the customer computing device 208 may not include the display 276, and information can be presented by other means, such as aurally, via a projection onto another surface, etc.

Other components included in the customer computing device 208 can include one or more sensors 278, such as an accelerometer, gyroscope, compass, proximity sensor, camera, microphone, and/or a switch, as discussed above. Additionally, the customer computing device 208 can include various other components that are not shown, examples of which include removable storage, a power source, such as a battery and power control unit, a barcode scanner, a printer, a cash drawer, and so forth.

FIGS. 3-6 are flow diagrams illustrating example processes according to some implementations. The processes of FIGS. 3-6 are illustrated as collections of blocks in logical flow diagrams, which represent a sequence of operations, some or all of which can be implemented in hardware, software or a combination thereof. In the context of software, the blocks can represent computer-executable instructions stored on one or more computer-readable media that, when executed by one or more processors, program the processor(s) to perform the recited operations. Generally, computer-executable instructions include routines, programs, objects, components, data structures and the like that perform particular functions or implement particular data types. The order in which the blocks are described should not be construed as a limitation. Any number of the described blocks can be combined in any order and/or in parallel to implement the process, or alternative processes, and not all of the blocks need be executed. Further, in some examples, some or all of the operations illustrated in one or more of FIGS. 3-6 can be combined with some or all of the operations illustrated in others of FIGS. 3-6. For discussion purposes, the processes are described with reference to the environments, architectures and devices described in the examples herein, although the processes can be implemented in a wide variety of other environments, architectures and devices.

Various instructions, methods and techniques described herein can be considered in the general context of computer-executable instructions, such as program modules stored on computer-readable media, and executed by the processor(s) herein. Generally, program modules include routines, programs, objects, components, data structures, etc., for performing particular tasks or implementing particular abstract data types. These program modules, and the like, can be executed as native code or can be downloaded and executed, such as in a virtual machine or other just-in-time compilation execution environment. Typically, the functionality of the program modules can be combined or distributed as desired in various implementations. An implementation of these modules and techniques can be stored on computer storage media or transmitted across some form of communication media.

Figure 3:
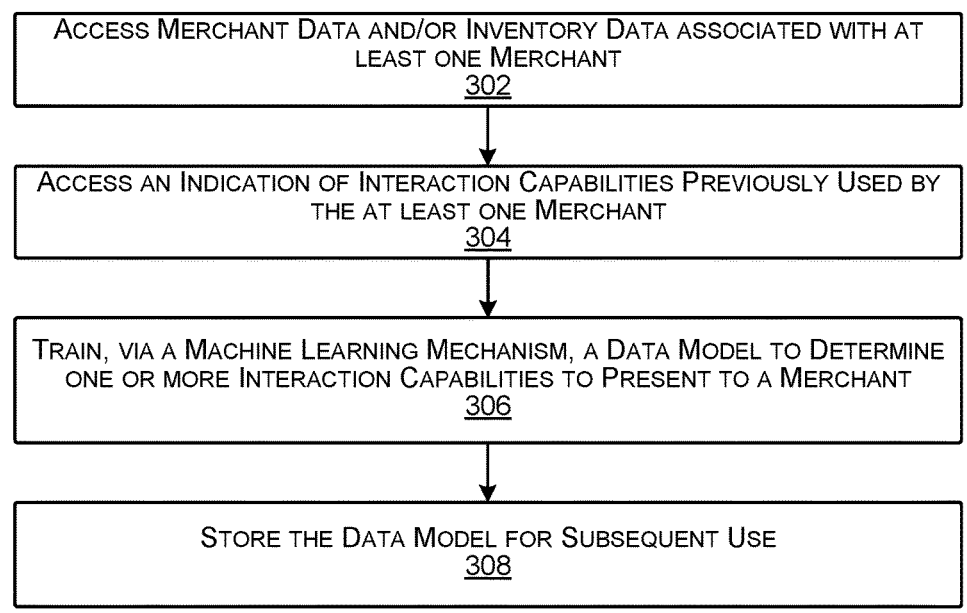
FIG. 3 illustrates an example process for training a data model for recommending interaction capabilities to merchants according to some implementations.

FIG. 3 illustrates an example process 300 for training a data model for recommending interaction capabilities to merchants.

Block 302 illustrates accessing merchant data and/or inventory data associated with at least one merchant. As described above, the service computing device(s) 204 can store merchant profile(s) 260. In at least one example, the merchant profile(s) 260 can store information associated with individual merchant(s) including, but not limited to, a MCC of individual merchant(s), geographic location(s) of physical store(s) of individual merchant(s), transaction data associated with transactions conducted by individual merchant(s), hardware (e.g., device type) used by individual merchant(s), etc. Additionally, the merchant profile(s) 260 can store inventory data associated with inventory(s) of merchant(s), as described above. In at least one example, the training module 246 can access merchant data and/or inventory data from the merchant profile(s) 260 associated with the at least one merchant.

Block 304 illustrates accessing an indication of interaction capabilities previously used by the at least one merchant. In at least one example, the merchant data can include indication(s) of interaction capabilities previously used by the at least one merchant. For instance, as a non-limiting example, the merchant data can indicate that a particular merchant previously selected to associate a cost sharing interaction capability and an alternate source ordering interaction capability with inventory tag(s) of the merchant.

Block 306 illustrates training, via a machine learning mechanism, a data model to determine one or more interaction capabilities to present to a merchant. In at least one example, the training module 240 can train one or more data models 248 via machine learning mechanisms. In at least one example, one of the one or more data models 248 can be used to determine one or more interaction capabilities to present to a merchant. In at least one example, the training module 240 can utilize a machine learning mechanism to build, modify, or otherwise utilize a data model that is created from example inputs and analyzes data to make predictions or decisions. In an example where a machine learning mechanism may be used to determine one or more interaction capabilities to present to a merchant, the data model may be trained using supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc. Furthermore, the data model may be trained based on the merchant data and/or inventory data associated with the at least one merchant and the indication of which interaction capabilities have been used by the at least one merchant.

In some examples, one or more of the data model(s) 248 can be trained on different sets of training data. For instance, in at least one example, a data model can be trained on merchant data and/or inventory data associated with a particular merchant. In such an example, the data model can make predictions or decisions regarding interaction capability(s) to be presented that are informed based on previous behaviors and/or actions of the particular merchant. In an additional and/or alternative examples, a data model can be trained on merchant data and/or inventory data associated with a cohort of merchants that share at least one characteristic (e.g., MCC, geolocation, etc.). In such examples, the data model can make predictions or decisions regarding interaction capability(s) to be presented that are informed based on previous behaviors and/or actions of a group of similar merchants (e.g., merchants that share at least one characteristic). Furthermore, in at least one example, a data model can be trained on merchant data and/or inventory data associated with a general population of merchants. In such an example, the data model can make predictions or decisions regarding interaction capability(s) to be presented that are informed based on previous behaviors and/or actions of a plurality of merchants that may or may not share one or more characteristics.

Block 308 illustrates storing the data model for subsequent use. In at least one example, the one or more data models 248 can be stored in the training module 246 for subsequent use. As described above, the interaction capability determination module 250 can determine one or more interaction capabilities to present to a merchant (e.g., for selection) using the one or more data models 248. In at least one example, the interaction capability determination module 250 can access merchant data and/or inventory data associated with a merchant (e.g., from a merchant profile of the merchant profile(s)) and can analyze the merchant data and/or the inventory data utilizing the one or more data models 248. The one or more data models 248 can output one or more interaction capabilities to present to a merchant. In some examples, the output can be particular to the merchant, can be associated with one or more other merchants that share at least one characteristic (e.g., MCC, geolocation, etc.) with the merchant, or can be associated with a general population of merchants, depending on which data model of the one or more data models 248 is used by the interaction capability determination module 250.

Figure 4:
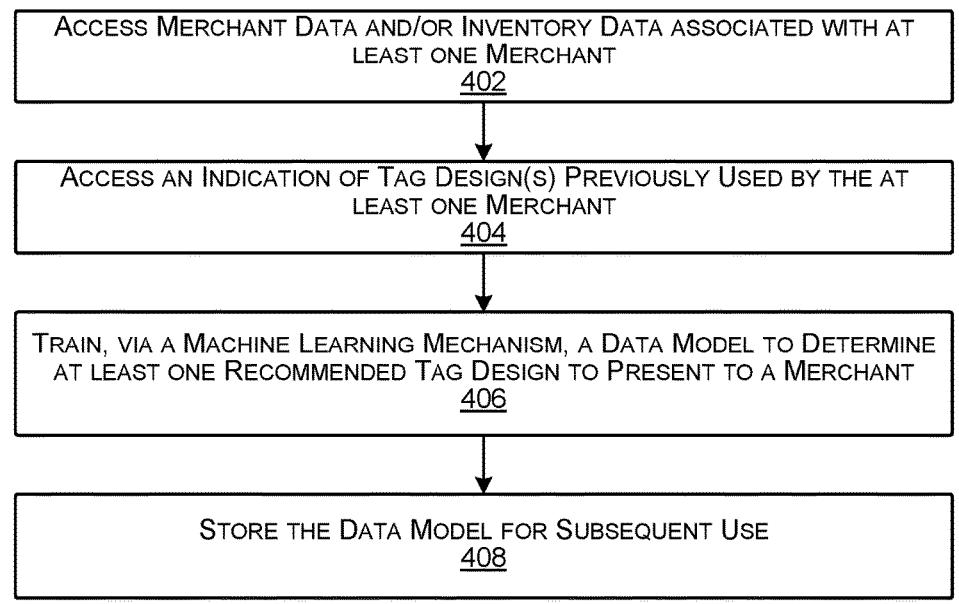
FIG. 4 illustrates an example process for training a data model for recommending tag designs to merchants according to some implementations.

FIG. 4 illustrates an example process 400 for training a data model for recommending tag designs to merchants.

Block 402 illustrates accessing merchant data and/or inventory data associated with at least one merchant. As described above, the service computing device(s) 204 can store merchant profile(s) 260. In at least one example, the merchant profile(s) 260 can store information associated with individual merchant(s) including, but not limited to, a MCC of individual merchant(s), geographic location(s) of physical store(s) of individual merchant(s), transaction data associated with transactions conducted by individual merchant(s), hardware (e.g., device type) used by individual merchant(s), etc. Additionally, the merchant profile(s) 260 can store inventory data associated with inventory(s) of merchant(s), as described above. In at least one example, the training module 246 can access merchant data and/or inventory data from the merchant profile(s) 260.

Block 404 illustrates accessing an indication of tag design(s) previously used by the at least one merchant. In at least one example, the merchant data can include indication(s) of tag designs previously used by the at least one merchant.

Block 406 illustrates training, via a machine learning mechanism, a data model to determine at least one recommended tag design to present to a merchant. The training module 240 can train one or more data models 248 via machine learning mechanisms. In at least one example, one of the one or more data models 248 can be used to determine at least one tag design to recommend to a merchant. In at least one example, the training module 240 can utilize a machine learning mechanism to build, modify, or otherwise utilize a data model that is created from example inputs and analyzes data to make predictions or decisions. In an example where a machine learning mechanism may be used to determine a tag design to present to a merchant, the data model may be trained using supervised learning algorithms (e.g., artificial neural networks, Bayesian statistics, support vector machines, decision trees, classifiers, k-nearest neighbor, etc.), unsupervised learning algorithms (e.g., artificial neural networks, association rule learning, hierarchical clustering, cluster analysis, etc.), semi-supervised learning algorithms, deep learning algorithms, etc. Furthermore, the data model may be trained based on the merchant data and/or inventory data associated with the at least one merchant and the indication of which tag design(s) have been used by the at least one merchant.

In some examples, one or more of the data model(s) 248 can be trained on different sets of training data. For instance, in at least one example, a data model can be trained on merchant data and/or inventory data associated with a particular merchant. In such an example, the data model can make predictions or decisions regarding tag design(s) that are informed based on previous behaviors and/or actions of the particular merchant. In an additional and/or alternative examples, a data model can be trained on merchant data and/or inventory data associated with a cohort of merchants that share at least one characteristic (e.g., MCC, geolocation, etc.). In such examples, the data model can make predictions or decisions regarding tag design(s) that are informed based on previous behaviors and/or actions of a group of similar merchants (e.g., merchants that share at least one characteristic). Furthermore, in at least one example, a data model can be trained on merchant data and/or inventory data associated with a general population of merchants. In such an example, the data model can make predictions or decisions regarding tag design(s) that are informed based on previous behaviors and/or actions of a plurality of merchants that may or may not share one or more characteristics.

Block 408 illustrates storing the data model for subsequent use. In at least one example, the one or more data models 248 can be stored in the training module 246 for subsequent use. As described above, in at least one example, the tag generation module 252 can determine at least one recommended tag design using one or more data models 248. In such an example, the tag generation module 252 can utilize the one or more data models 248 to analyze merchant data and/or inventory data associated with the merchant to output at least one recommended tag design. In some examples, the output can be particular to the merchant, can be associated with one or more other merchants that share at least one characteristic (e.g., MCC, geolocation, etc.) with the merchant, or can be associated with a general population of merchants, depending on which data model of the one or more data models 248 is used by the tag generation module 252.

Figure 5:
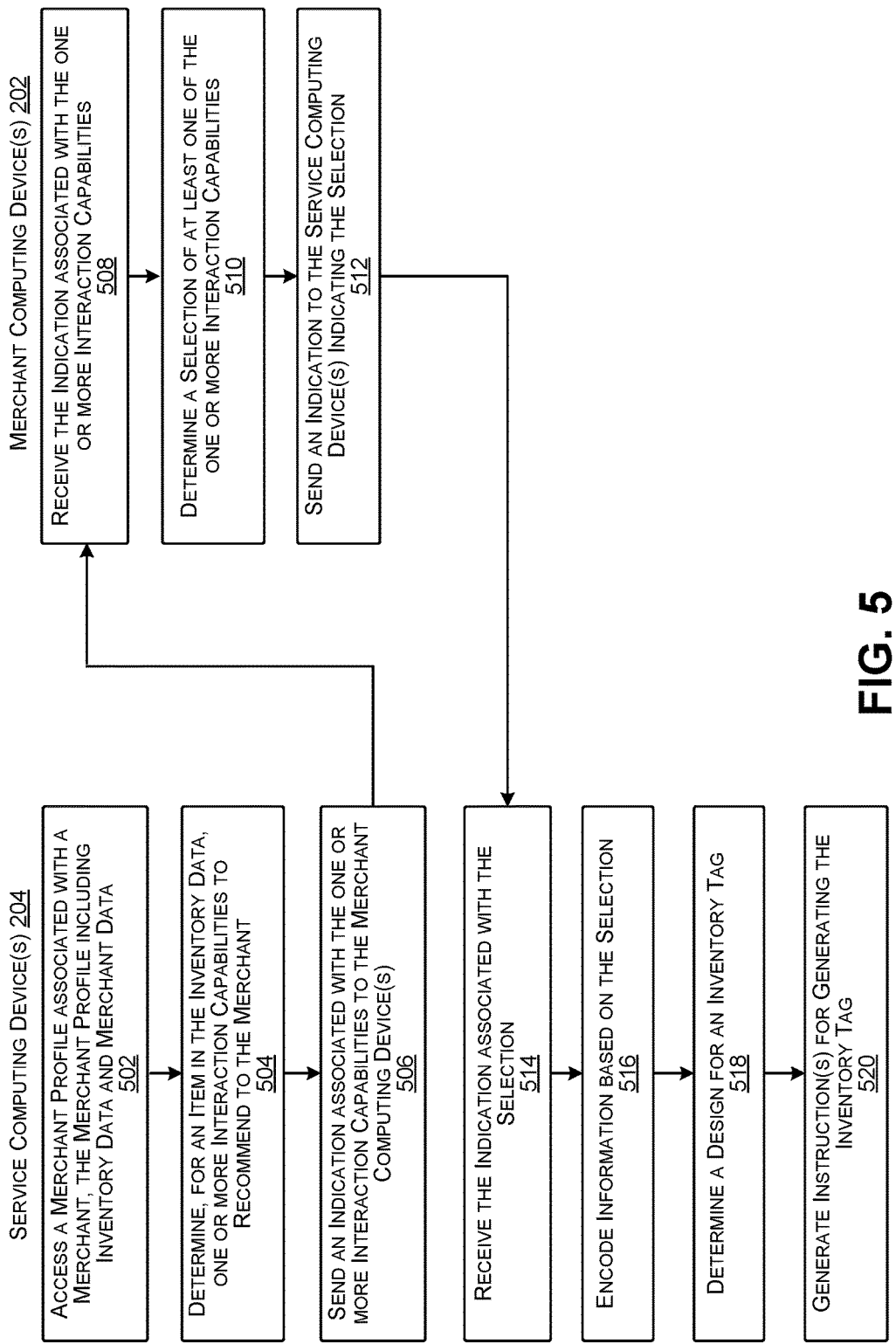
FIG. 5 illustrates an example process for generating an inventory tag according to some implementations.

FIG. 5 illustrates an example process 500 for generating an inventory tag according to some implementations.

Block 502 illustrates accessing a merchant profile associated with a merchant, the merchant profile including inventory data and merchant data. As described above, the service computing device(s) 204 can store merchant profile(s) 260. In at least one example, the merchant profile(s) 260 can store information associated with individual merchant(s) including, but not limited to, a MCC of individual merchant(s), geographic location(s) of physical store(s) of individual merchant(s), transaction data associated with transactions conducted by individual merchant(s), hardware (e.g., device type) used by individual merchant(s), etc. Additionally, the merchant profile(s) 260 can store inventory data associated with inventory(s) of merchant(s), as described above. In at least one example, the interaction capability determination module 250 can access merchant data and/or inventory data from the merchant profile(s) 260.

Block 504 illustrates determining, for an item in the inventory data, one or more interaction capabilities to recommend to the merchant. The interaction capability determination module 250 can determine one or more interaction capabilities to present to a merchant (e.g., for selection). In at least one example, the interaction capability determination module 250 can utilize a data model of the one or more data models 248 to determine which interaction capabilities to present to a merchant. In at least one example, the interaction capability determination module 250 can access merchant data and/or inventory data associated with a merchant (e.g., from a merchant profile of the merchant profile(s)) and can analyze the merchant data and/or the inventory data utilizing the one or more data models 248. The one or more data models 248 can output one or more interaction capabilities to present to a merchant. In some examples, the output can be particular to the merchant, can be associated with one or more other merchants that share at least one characteristic (e.g., MCC, geolocation, etc.) with the merchant, or can be associated with a general population of merchants, depending on which data model of the one or more data models 248 is used by the interaction capability determination module 250.

Block 506 illustrates sending an indication associated with the one or more interaction capabilities to the merchant computing device(s). In at least one example, the tag generation module 252 can receive, from the interaction capability determination module 250, one or more interaction capabilities for presenting to a merchant. The tag generation module 252 can send an indication to the merchant computing device(s) 202 that is associated with one or more interaction capabilities that are to be presented to the merchant (e.g., for selection).

In at least one example, the interaction capability determination module 250 can perform the operations described above in blocks 502-506 responsive to receiving a request to generate a tag for an item (e.g., via an interaction with the UI to manage tag generation 218). In additional and/or alternative examples, the interaction capability determination module 250 can perform the operations described above in blocks 502-506 at a particular frequency, etc.

Block 508 illustrates receiving the indication associated with the one or more interaction capabilities. In at least one example, the UI to manage tag generation 218 can receive information from the service computing device(s) 204 that the UI to manage tag generation 218 can utilize to present a via a user interface to a merchant. In at least one example, such a user interface can include elements representative of one or more interaction capabilities from which the merchant can select.

Block 510 illustrates determining a selection of at least one of the one or more interaction capabilities. In at least one example, the UI to manage tag generation 218 can determine that the merchant selects one or more of the interaction capabilities and can send an indication of the selection(s) to the service computing device(s) 204, as illustrated in block 512.

Block 514 illustrates receiving the indication associated with the selection. In at least one example, the tag generation module 252 can receive the indication of the selection(s) from the merchant computing device(s) 202, and can encode information to be associated with an inventory tag based on the selection(s), as illustrated in block 516. In at least one example, responsive to receiving a selection of one or more interaction capabilities, the tag generation module 252 can generate encoded information that is to be associated with an inventory tag. That is, the tag generation module 252 can encode a barcode, a short-range communication tag, etc. with data such that when a customer computing device (e.g., customer computing device 208) interacts with the barcode, the short-range communication tag, etc., a user interface can be presented to the customer to avail the one or more interaction capabilities to the customer. For instance, in at least one example, the tag generation module 252 can associate data corresponding to a particular interaction capability with a barcode, short-range communication tag, etc.

Block 518 illustrates determining a design for an inventory tag. In at least one example, the tag generation module 252 can determine at least one recommended tag design. In such an example, the tag generation module 252 can utilize the one or more data models 248 to analyze merchant data and/or inventory data associated with the merchant to output at least one recommended tag design. In some examples, the output can be particular to the merchant, can be associated with one or more other merchants that share at least one characteristic (e.g., MCC, geolocation, etc.) with the merchant, or can be associated with a general population of merchants, depending on which data model of the one or more data models 248 is used by the tag generation module 252.

The tag generation module 252 can send an indication to the merchant computing device(s) 202 that is associated with the at least one recommended tag design that is to be presented to the merchant. Such an indication can be in association with the indication of the one or more interaction capabilities, or can be a separate indication. In at least one example, the UI to manage tag generation 218 can receive the indication and enable a merchant to determine a design for one or more inventory tags. In some examples, a merchant can confirm selection of a recommended tag design. In at least one example, the recommended tag design(s) can be pre-populated with information associated with an item, which can be obtained from inventory data and/or merchant data stored by the service computing device(s) 204. In additional and/or alternative examples, the recommended tag design(s) may require the merchant to input data to complete the tag design. For instance, the merchant can input a logo, an image of an item, and/or additional or alternative information via the UI to manage tag generation 218. In other examples, a merchant can provide its own design for the inventory tag via the UI to manage tag generation 218. That is, the merchant can choose design elements and/or information that are to be associated with one or more inventory tags. The UI to manage tag generation 218 can send an indication of the tag design (e.g., an acceptance of a recommended tag design and/or information regarding a tag design) to the service computing device(s) 204 and the tag generation module 252 can determine the design for the inventory tag based on the indication.

Block 520 illustrates generating instruction(s) for generating the inventory tag. In at least one example, the tag generation module 252 can generate instructions for generating one or more inventory tags based on the selected interaction capability(s) and/or the tag design. The instructions can inform the production of one or more inventory tags, for instance regarding the encoded information and/or a tag design for the one or more inventory tags.

As described above, in at least one example, the tag generation module 252 can send the instructions to another component of the service computing device(s) 204 (e.g., input/output devices 244) and the other component can generate the one or more inventory tags utilizing the instructions. For instance, the other component can print the one or more inventory tags based on the instructions. In such an example, the payment processing service can send, or otherwise provide, the one or more inventory tags to the merchant. In an additional and/or alternative example, the tag generation module 252 can send the instructions to facilitate generating one or more inventory tags back to the merchant computing device(s) 202, and the merchant computing device(s) 202 can leverage the instructions to generate the one or more inventory tags. In some examples, the tag generation module 252 can send the instructions to facilitate generating one or more inventory tags to a third-party source and/or system (e.g., a printing company, etc.), and the third-party source and/or system can leverage the instructions to generate the one or more inventory tags. In such an example, the third-party source and/or system can send, or otherwise provide, the one or more inventory tags to the merchant.

Figure 6:
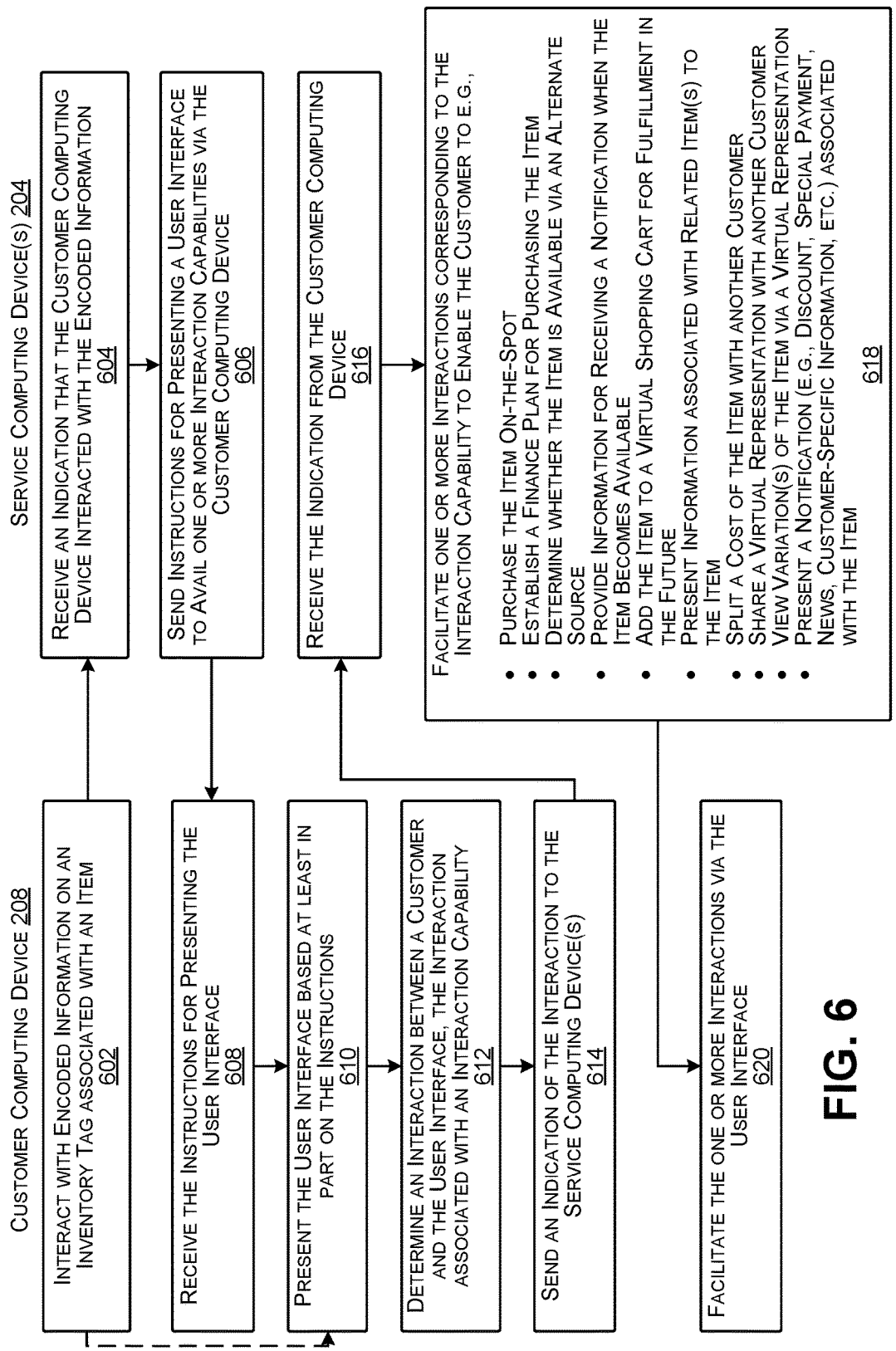
FIG. 6 illustrates an example process for facilitating one or more interaction capabilities based on an interaction between a customer computing device and an inventory tag according to some implementations.

FIG. 6 illustrates an example process 600 for facilitating one or more interaction capabilities based on an interaction between a customer computing device and an inventory tag.

Block 602 illustrates interacting with encoded information on an inventory tag associated with an item. In at least one example, an input/output device 268 and/or a sensor 278 associated with a customer computing device 208 can interact with encoded information associated with the inventory tag. For instance, a camera or barcode reader can read a barcode associated with the inventory tag, or a short-range communication tag reader can read a short-range communication tag associated with the inventory tag. Based at least in part on interacting with the encoded information on the inventory tag, the UI for user interaction 270 can send an indication to the service computing device(s) 204 that the customer computing device 208 interacted with the encoded information.

Block 604 illustrates receiving an indication that the customer computing device interacted with the encoded information. In at least one example, the interaction management module 254 can receive an indication that the customer computing device 208 interacted with encoded information associated with the inventory tag.

Block 606 illustrates sending instructions for presenting a user interface to avail one or more interaction capabilities via the customer computing device. Based at least in part on receiving an indication that the customer computing device 208 interacted with the encoded information, the interaction management module 254 can send instructions associated with presenting a user interface via the customer computing device 208 to the customer computing device 208. The user interface can present one or more interaction capabilities that have been previously associated with the encoded information to the customer.

Block 608 illustrates receiving the instructions for presenting the user interface. In at least one example, the UI for user interaction 270 can receive instructions from the service computing device(s) 204 for presenting the user interface and the UI for user interaction 270 can be configured to present the user interface, as illustrated in block 610. In an alternative example, the encoded information can store the instructions for presenting the user interface and, the UI for user interaction 270 can present the user interface responsive to the interaction between the customer computing device 208 and the inventory tag (as shown by the dashed line from block 602 to block 610).

Block 612 illustrates determining an interaction between a customer and the user interface, the interaction associated with an interaction capability. As described above, the user interface presented by the UI for user interaction 270 can enable one or more interactions associated with one or more interaction capabilities associated with encoded information of an inventory tag. In at least one example, the user interface can include an element representative of each interaction capability associated with the encoded information of an inventory tag. In at least one example, the UI for user interaction 270 can determine an interaction between the customer and a particular element representative of an interaction capability, and can send an indication to the service computing device(s) 204, as illustrated in block 614.

Block 616 illustrates receiving the indication from the customer computing device. In at least one example, the interaction management module 254 can receive an indication of which interaction capability the customer interacts with via the user interface.

Block 618 illustrates facilitating one or more interactions corresponding to the interaction capability. The interaction management module 254 can facilitate interactions associated with the one or more interaction capabilities. Based on receiving an indication of which interaction capability the customer interacts with via the user interface, the interaction management module 254 can perform one or more actions to facilitate one or more interactions corresponding to the interaction capability. In at least one example, the interaction management module 254 can utilize one or more other modules and data 256 associated with the service computing device(s) 204 to facilitate the one or more interactions. Furthermore, in some examples, the interaction management module 254 can utilize other modules and data associated with the merchant computing device(s) 202 to facilitate the one or more interactions. Various examples of such interactions are provided below.

In at least one example, as described above, encoded information associated with an inventory tag corresponding to an item can be associated with an interaction capability that enables a customer to buy an item on-the-spot (e.g., without going to a designated check-out location). In such an example, based at least in part on determining that a customer interacts with the user interface such to indicate that he/she desires to purchase the item on-the-spot, the interaction management module 254 can access customer data associated with the customer (e.g., previously received from the customer and/or provided in near-real time) to complete the transaction. That is, the interaction management module 254 can facilitate the transaction by obtaining payment data (e.g., previously received from the customer and/or provided in near-real time) and completing the transaction.

As described above, encoded information associated with an inventory tag corresponding to an item can be associated with an interaction capability that enables a customer to determine a finance plan (e.g., independent of credit card financing) for purchasing the item. In such an example, based at least in part on determining that a customer interacts with the user interface such to indicate that he/she desires to determine a finance plan for purchasing the item, the interaction management module 254 can access customer data associated with the customer (e.g., previously received from the customer and/or provided in near-real time) to determine a risk associated with lending funds to the customer. The interaction management module 254 can access inventory data to determine a cost of the item and/or one or more finance plans that are available for purchasing the item. Based on the determined risk, the cost, and/or the one or more available finance plans, the interaction management module 254 can determine a finance plan for the customer. Based on determining a finance plan for the customer, the interaction management module 254 can send a request for additional information that is required for processing the loan (if necessary) and/or can send an indication that the loan is being processed, and the interaction management module 254 facilitate the purchase of the item based at least in part on the funded loan. For instance, the interaction management module 254 can facilitate payment of the cost of the item via funds associated with the payment processing service, which the customer can pay back to the payment processing service over time.

Additionally and/or alternatively, as described above, encoded information associated with an inventory tag corresponding to an item can be associated with an interaction capability that enables a customer to determine whether the item is available via an alternate source (e.g., if the item is unavailable). In some examples, a particular physical store of a merchant may be sold out of an item and/or the item may otherwise be unavailable. In such examples, based at least in part on determining that a customer interacts with the user interface such to indicate that he/she desires to check the availability of the item via an alternative source, the interaction management module 254 can access merchant profile(s), described below, to determine whether the item is available via the merchant (e.g., via another physical store of the merchant or online) or via another merchant (e.g., via a physical store of the other merchant or online). If the item is available via the merchant or via another merchant, the interaction management module 254 can send an indication to the customer computing device 208 to notify the customer that the item is available. If the item is available from one or more merchants, the interaction management module 254 can rank the one or more merchants based on proximity to the current location of the customer (e.g., based on geolocation of the current physical store), cost of the item, customer preference, etc. In at least one example, the customer can interact with the user interface to purchase the item from the alternative source (e.g., the merchant or the other merchant). Based at least in part on receiving the customer's input, the interaction management module 254 can facilitate fulfillment of the item. In at least one example, if the customer purchases the item from another merchant that utilizes services offered by the payment processing service, the interaction management module 254 can facilitate profit sharing between the merchant (where the customer originally expressed interest in the product) and the other merchant (that ultimately fulfilled delivery of the product to the customer).

Moreover, as described above, encoded information associated with an inventory tag corresponding to an item can be associated with an interaction capability that enables a customer to provide information in order to receive a notification when the item becomes available (e.g., if the item is unavailable). In some examples, a particular physical store of a merchant may be sold out of an item and/or the item can be otherwise unavailable. In such examples, based at least in part on determining that a customer interacts with the user interface such to indicate that he/she desires to receive a notification when the item is restocked, the interaction management module 254 can send a request for contact information for the customer (if such information is not associated with the indication that the customer desires to receive a notification when the item is restocked and/or otherwise stored in association with the service computing device(s) 204). The interaction management module 254 can add an indicator to the item in the inventory data associated with the item such that when the inventory data associated with the merchant indicates that the item is available, the interaction management module 254 can send an indication to the customer computing device 208 to inform the customer that the item is available.

Additionally and/or alternatively, as described above, encoded information associated with an inventory tag corresponding to an item can be associated with an interaction capability that enables a customer to add the item to a virtual shopping cart for future fulfillment. For instance, the customer can interact with the user interface to add the item (e.g., a representation of the item) to a virtual shopping cart and indicate that he/she would like to pick-up the item upon check-out or have the item shipped to the customer's home or other physical location. In such examples, the interaction management module 254 can add a representation of the item to a virtual shopping cart (e.g., an open ticket or other electronic record). In at least one example, if the customer indicates that he/she desires to pick-up the item upon check-out, the interaction management module 254 can send one or more instructions to the merchant computing device(s) 202 to enable the merchant to move the item to a check-out area of the physical store. Accordingly, when the customer is ready to check-out, for instance via a transaction performed via the merchant computing device(s) 202, the merchant can transfer possession of the item to the customer. Or, in an example where the customer indicates that he/she desires to have the item shipped to his/her home or another location, the interaction management module 254 can prompt the customer for shipping information (e.g., via the customer computing device 208) and can facilitate fulfillment of the item to the customer using the shipping information.

In at least one example, as described above, encoded information associated with an inventory tag corresponding to an item can be associated with an interaction capability that enables a customer to receive information associated with one or more additional items that are related to the item. In some examples, the service computing device(s) 204 can analyze merchant data associated with one or more merchants to determine relationships between items. For instance, as a non-limiting example, merchant data can indicate that customers who buy a particular cooking pan also buy an oven glove and a cooling rack. In such examples, the interaction management module 254 can receive an indication that a customer is interested in a particular item (associated with the encoded information), can access a data item associated with the particular item, and can determine that the particular item is associated with one or more related items. Accordingly, the interaction management module 254 can send an indication of the one or more related items to the customer computing device 208 for presentation to the customer.

Furthermore, as described above, encoded information associated with an inventory tag corresponding to an item can be associated with an interaction capability that enables a customer to split a cost of the item with another customer. In at least one example, a customer can indicate that he/she desires to split a cost of an item with another customer. In such an example, the interaction management module 254 can receive such an indication and can send a notification to a device operated by the other customer. The notification can indicate that the customer desires to split a cost of an item with the other customer. Responsive to receiving an indication that the other customer agrees to split the cost of the item with the other customer, the interaction management module 254 can associate an indication of such with the item, a customer identifier associated with the customer (e.g., which can be determined based on a particular instance of the UI for user interaction 270), a payment instrument of the customer, etc. Accordingly, when the customer checks-out, for instance via a transaction performed by the merchant computing device(s) 202, the interaction management module 254 can receive an indication of the item, the customer identifier, or the payment instrument of the customer and, based on the indication that the customer and the other customer have agreed to split the cost of the item, can charge the payment instrument of the customer a first amount associated with a first portion of the cost of the item and can charge a payment instrument of the other customer a second amount associated with a second portion of the cost of the item. In some examples, the interaction management module 254 may request information from the other customer (e.g., payment information, etc.) in order to complete the transaction.

In at least one example, as described above, encoded information associated with an inventory tag corresponding to an item can be associated with an interaction capability that enables a customer to share a virtual representation of the item with another customer via an augmented reality application. In at least one example, the service computing device(s) 204 can receive data associated with a multi-dimensional model of an item. In an example, the data can be collected via a camera associated with a data collection device and sent to the service computing device(s) 204. In at least one example, the multi-dimensional model can be used to generate a virtual representation of the item. In such examples, the service computing device(s) 204 can associate the data with an instance of the item in the inventory data of the merchant. Based at least in part on receiving an indication that a customer desires to share the virtual representation of the item with another customer, the interaction management module 254 can access the data associated with the multi-dimensional model of the item and can send, to a device operated by the other customer, the data associated with the multi-dimensional model of the item. In such an example, an augmented reality application associated with the device operated by the other customer can cause the virtual representation of the item to be presented in an environment of the other customer.

In additional and/or alternative examples, the multi-dimensional model associated with an item can be utilized to present virtual representations of one or more variations of the item. For instance, the multi-dimensional model can be rendered with different graphical content and/or via one or more transforms (e.g., scaling) such to present variations of an item (e.g., size, color, etc.) via an augmented reality application on the customer computing device 208. In such an example, based at least in part on receiving an indication that a customer desires to view one or more variations of the item via an augmented reality application, the interaction management module 254 can access the data associated with the multi-dimensional model of the item and can send, to the customer computing device 208, the data associated with the multi-dimensional model (and one or more variations as determined from inventory data associated with the merchant) of the item. In such an example, an augmented reality application associated with the customer computing device 208 can cause the virtual representation of the item to be presented to the customer and enable the customer to view the one or more variations. Accordingly, the customer can compare the virtual alternate version of the item alongside the physical (real) version of an item using augmented reality, in some example.

Additionally and/or alternatively, as described above, encoded information associated with an inventory tag corresponding to an item can be associated with an interaction capability that enables a customer to receive a notification associated with at least one of a discount, a special payment, news, or customer-specific information associated with the item. In some examples, inventory data can indicate that an item is associated with a discount on a particular day and/or at a particular time (which can be changed throughout a day, a week, a month, etc.). In additional and/or alternative examples, inventory data can indicate that an item is eligible for special pricing (e.g., EBT, etc.). Additionally and/or alternatively, inventory data can be associated with information indicating news associated with a particular item (e.g., a celebrity wore the item at an event, an item was recalled, etc.). In some examples, based on receiving an indication that the customer computing device 208 interacts with encoded information associated with an item, the interaction management module 254 can access inventory data to determine whether any additional information (e.g., discounts, special pricing, news, etc.) is associated with the corresponding item. If there is additional information associated with the corresponding item, the interaction management module 254 can send an indication of such to the customer computing device 208 for presentation to the customer.

In some examples, an indication that the customer computing device 208 interacts with encoded information associated with an item can be associated with a customer identifier (e.g., based on a particular instance of the UI for user interaction 270). In such examples, the interaction management module 254 can leverage the customer identifier to personalize information presented to the customer. For instance, if a customer identifier indicates that the customer is an influencer (e.g., drives business via social media), a celebrity, a loyal customer (e.g., shops with the merchant at a particular frequency or above a threshold number of times, etc.), etc., the interaction management module 254 can reduce the cost of the item (e.g., indicate that the item is available at a discount) and/or offer another benefit. Additionally and/or alternatively, the interaction management module 254 can utilize the customer identifier to access customer-specific data, which can include payment information, data indicative of customer behavior at one or more merchants associated with the payment processing service, etc. For instance, the interaction management module 254 can utilize the payment information to indicate one or more options for payment (e.g., gift card, wallet, cryptocurrency, etc.) that are particular to the customer. Or, based on the customer identifier, the interaction management module 254 can utilize information available via social network(s) associated with the customer to access reviews from friends/family of the customer and/or to identify other information that may be relevant for the customer. Based on determining such information, the interaction management module 254 can send such information to the customer computing device 208 for presentation to the customer.

Block 620 illustrates facilitating the one or more interactions via the user interface. As described above, based on receiving an indication regarding how the customer interacts with the user interface, the service computing device(s) 204 can perform one or more actions to facilitate one or more interactions corresponding to the selected interaction capability. In at least one example, the service computing device(s) 204 can exchange data with the UI for user interaction 270 to facilitate the one or more interactions via the user interface. Various examples are provided below.

In at least one example, as described above, encoded information associated with an inventory tag corresponding to an item can be associated with an interaction capability that enables a customer to buy an item on-the-spot (e.g., without going to a designated check-out location). In such an example, based at least in part on determining that a customer interacts with the user interface such to indicate that he/she desires to purchase the item on-the-spot, the UI for user interaction 270 can send an indication of such to the service computing device(s) 204. The service computing device(s) 204 can facilitate the transaction. In at least one example, the service computing device(s) 204 can provide an indication that customer data is needed to complete the transaction. In such an example, the UI for user interaction 270 can prompt the customer for the required customer data.

For example, as described above, encoded information associated with an inventory tag corresponding to an item can be associated with an interaction capability that enables a customer to determine a finance plan (e.g., independent of credit card financing) for purchasing the item. In such an example, based at least in part on determining that a customer interacts with the UI for user interaction 270 such to indicate that he/she desires to determine a finance plan for the item, the UI for user interaction 270 can send an indication that the customer desires to determine a finance plan for purchasing the item to the service computing device(s) 204, and can receive, from the service computing device(s), a request for additional information that is required for processing the loan (if necessary) and/or an indication that the loan is being processed. In either and/or both examples, the UI for user interaction 270 can present the request and/or indication via a display of the customer computing device 208.

Additionally and/or alternatively, as described above, encoded information associated with an inventory tag corresponding to an item can be associated with an interaction capability that enables a customer to determine whether the item is available via an alternate source (e.g., if the item is unavailable). In some examples, a particular physical store of a merchant may be sold out of an item and/or the item can be otherwise unavailable. In such examples, based at least in part on determining that a customer interacts with the UI for user interaction 270 such to indicate that he/she desires to check the availability of the item at another store, the UI for user interaction 270 can provide such an indication to the service computing device(s) 204 and, if the item is available via the merchant and/or another merchant, the UI for user interaction 270 can receive an indication that the item is available. If the item is available from one or more merchants, the UI for user interaction 270 can present the one or more merchants in a ranked order based on proximity to the current location of the customer (e.g., based on geolocation of the current physical store), cost of the item, preference of the customer, etc. In at least one example, the customer can interact with the UI for user interaction 270 to purchase the item from the alternative source (e.g., the merchant or the other merchant). Based at least in part on receiving the customer's input, the UI for user interaction 270 can send an indication of the customer's input to the service computing device(s) 2054 to facilitate fulfillment of the item.

Moreover, as described above, encoded information associated with an inventory tag corresponding to an item can be associated with an interaction capability that enables a customer to provide information in order to receive a notification when the item becomes available (e.g., if the item is unavailable). In some examples, a particular physical store of a merchant may be sold out of an item and/or the item can be otherwise unavailable. In such examples, based at least in part on determining that a customer interacts with the UI for user interaction 270 such to indicate that he/she desires to receive a notification when the item is restocked, the UI for user interaction 270 can send an indication of such to the service computing device(s) 204 and, in some examples, can receive a request for contact information for the customer (if such information is not associated with the indication that the customer desires to receive a notification when the item is restocked and/or otherwise stored in association with the service computing device(s) 204). When the inventory data associated with the merchant indicates that the item is available, the UI for user interaction 270 can receive an indication of such, and can surface information to inform the customer that the item is available.

Additionally and/or alternatively, as described above, encoded information associated with an inventory tag corresponding to an item can be associated with an interaction capability that enables a customer to add the item to a virtual shopping cart for future fulfillment. For instance, the customer can interact with the UI for user interaction 270 to the item (e.g., a representation of the item) to a virtual shopping cart and indicate that he/she would like to pick-up the item upon check-out or have the item shipped to the customer's home or other physical location. In such examples, the UI for user interaction 270 can send an instruction to the service computing device(s) 204 to add a representation of the item to a virtual cart (e.g., an open ticket or other electronic ticket). In at least one example, if the customer indicates that he/she desires to have the item shipped to his/her home or another location, the UI for user interaction 270 can prompt the customer for shipping information and can provide such information to the service computing device(s) 104 to facilitate fulfillment of the item to the customer.

In at least one example, as described above, encoded information associated with an inventory tag corresponding to an item can be associated with an interaction capability that enables a customer to receive information associated with one or more additional items that are related to the item. In at least one example examples, the UI for user interaction 270 can receive an indication that a customer is interested in a particular item (associated with the encoded information), and can send an indication of such to the service computing device(s) 204. In response, the service computing device(s) 204 can access a data item associated with the particular item, and can determine that the particular item is associated with one or more related items. Accordingly, the service computing device(s) 204 can send an indication of the one or more related items to the customer computing device 208 and the UI for user interaction 270 can present the one or more related items to the customer.

Furthermore, as described above, encoded information associated with an inventory tag corresponding to an item can be associated with an interaction capability that enables a customer to split a cost of the item with another customer. In at least one example, a customer can indicate that he/she desires to split a cost of an item with another customer. In such an example, the UI for user interaction 270 can receive such an indication and can forward the indication to the service computing device(s) 204 to facilitate splitting the cost of the item between the merchant and the other merchant.

In at least one example, as described above, encoded information associated with an inventory tag corresponding to an item can be associated with an interaction capability that enables a customer to share a virtual representation of the item with another customer via an augmented reality application. In at least one example, the UI for user interaction 270 can receive an indication that a customer desires to share the virtual representation of the item with another customer, and can forward the indication to the service computing device(s) 204 to enable the service computing device(s) 204 to facilitate sharing the virtual representation of the item with the other customer via an augmented reality application.

In additional and/or alternative examples, the multi-dimensional model associated with an item can be utilized to present virtual representations of one or more variations of the item, as described above. For instance, the multi-dimensional model can be rendered with different graphical content and/or via one or more transforms (e.g., scaling) such to present variations of an item (e.g., size, color, etc.) via an augmented reality application on the customer computing device 208. In such an example, based at least in part on receiving an indication that a customer desires to view one or more variations of the item via an augmented reality application, the UI for user interaction 270 can send an indication of such to the service computing device(s) 204 and can receive data associated with the multi-dimensional model (and one or more variations as determined from inventory data associated with the merchant) of the item. In such an example, an augmented reality application associated with the customer computing device 208 can cause the virtual representation of the item to be presented to the customer and enable the customer to view the one or more variations. Accordingly, in at least one example, the customer can compare the virtual alternate version of an item alongside the physical (real) version of the item using augmented reality.

Additionally and/or alternatively, as described above, encoded information associated with an inventory tag corresponding to an item can be associated with an interaction capability that enables a customer to receive a notification associated with at least one of a discount, a special payment, news, or customer-specific information associated with the item. In some examples, inventory data can indicate that an item is associated with a discount on a particular day and/or at a particular time (which can be changed throughout a day, a week, a month, etc.). In additional and/or alternative examples, inventory data can indicate that an item is eligible for special pricing (e.g., EBT, etc.). Additionally and/or alternatively, inventory data can be associated with information indicating news associated with a particular item (e.g., a celebrity wore the item at an event, an item was recalled, etc.). In some examples, based on receiving an indication that the customer computing device 208 interacts with encoded information associated with an item, the UI for user interaction 270 can send an indication of such to the service computing device(s) 204. In response, the service computing device(s) 204 can access inventory data to determine whether any additional information (e.g., discounts, special pricing, news, etc.) is associated with the corresponding item. If there is additional information associated with the corresponding item, the service computing device(s) 204 can send an indication of such to the customer computing device 208 for presentation via the UI for user interaction 270.

In some examples, an indication that the customer computing device 208 interacts with encoded information associated with an item can be associated with a customer identifier. In such examples, the service computing device(s) 204 can leverage the customer identifier to personalize information presented to the customer. For instance, if a customer identifier indicates that the customer is an influencer (e.g., drives business via social media), a celebrity, a loyal customer (e.g., shops with the merchant at a particular frequency or above a threshold number of times, etc.), etc., the service computing device(s) 204 can reduce the cost of the item (e.g., indicate that the item is available at a discount) and/or offer another benefit. Or, based on the customer identifier, the service computing device(s) 204 can offer various payment options (e.g., gift card, wallet, cryptocurrency, etc.) that are specific to the customer. Or, based on the customer identifier, the service computing device(s) 204 can utilize information available via social network(s) associated with the customer to access reviews from friends/family of the customer and/or to identify other information that may be relevant for the customer. Based on determining such information, the service computing device(s) 204 can send such information to the customer computing device 208 for presentation via the UI for user interaction 270.

As described above, in at least one example, the interaction capabilities and/or displayed augmented reality elements for a particular item may be specific for a certain customer based on the purchase behavior associated with the customer. For example, though the merchant may enable a specific set of interaction capabilities (e.g., display alternate sizes and colors in augmented reality, enable add to virtual cart, check availability of an item additional stores, etc.), the service computing device(s) 204 can utilize customer-specific data to modify which interaction capabilities are presented to a customer and/or which augmented reality elements are presented to a customer. For instance, the service computing device(s) 204 can leverage the customer identifier to access data indicative of purchase behavior of a customer (e.g., at one or more merchants associated with the payment processing service). The service computing device(s) 204 can leverage the data indicative of the purchase behavior of the customer to modify which interaction capabilities are presented to a customer and/or which augmented reality elements are presented to a customer. For instance, the service computing device(s) 204 can leverage the data indicative of the purchase behavior of the customer to determine that the customer only purchases one particular size or prefers a certain color, and would therefore surface the most relevant inventory and/or options for the particular user. In this way, two customers may interact with the same item tag and see different information and interaction capabilities. In at least one example, the service computing device(s) 204 can leverage a data model trained via a machine learning mechanism (described above).

Although the subject matter has been described in language specific to structural features and/or methodological acts, it is to be understood that the subject matter defined in the appended claims is not necessarily limited to the specific features or acts described. Rather, the specific features and acts are disclosed as example forms of implementing the claims.

What is claimed is:

1. A computer-implemented method for generating a tag that is to be associated with an item offered for sale by a merchant at a physical store of the merchant, the computer-implemented method comprising:
   receiving, at a server computing device associated with a payment processing service and from an application executing on a device associated with the merchant, a request to generate the tag for the item;
   accessing, by the server computing device and from a data store associated with the payment processing service, inventory data associated with the merchant that identifies items offered for sale by the merchant, the item being at least one of the items identified in the inventory data;

analyzing, by the server computing device, the inventory data associated with the merchant to determine, based at least in part on a data model trained utilizing a machine learning mechanism, interaction capabilities to be associated with an item tag for the item;

responsive to receiving a selection by the merchant of at least one interaction capability of the interaction capabilities, generating, by the server computing device, the item tag and instructions for the item tag to be printed on a physical marker, wherein the item tag is encoded with the at least one interaction capability that is available to customers; and responsive to receiving an indication that a device operated by a customer interacts with the physical marker at the physical store of the merchant, causing, by the server computing device, a presentation of a user interface on the device operated by the customer to facilitate at least one interaction corresponding to the at least one interaction capability.

2. A computer-implemented method as claim 1 recites, wherein the item is out of stock at the physical store, and the interaction capability enables the customer to determine whether the item is available via an alternative source associated with the merchant or via another merchant.

3. A computer-implemented method as claim 1 recites, wherein the at least one interaction capability enables the customer to add the item to a virtual shopping cart for future fulfillment.

4. A computer-implemented method as claim 1 recites, wherein the at least one interaction capability enables the customer to receive information associated with one or more additional items that are related to the item.

5. A computer-implemented method as claim 1 recites, wherein the at least one interaction capability enables the customer to split a cost of the item with another customer.

6. A computer-implemented method as claim 1 recites, wherein the at least one interaction capability enables the customer to share a virtual representation of the item with another customer via an augmented reality application.

7. A computer-implemented method as claim 1 recites, further comprising:
presenting the interaction capabilities via a merchant-facing user interface that enables the merchant to at least one of view information or control operations associated with a business of the merchant; and
receiving the selection of the at least one interaction capability responsive to an interaction between the merchant and the merchant-facing user interface.

8. A computer-implemented method as claim 7 recites, further comprising:
determining a shared characteristic between the merchant and one or more other merchants; and
determining the interaction capabilities to present via the merchant-facing user interface based at least in part on the shared characteristic between the merchant and the one or more other merchants.

9. A system comprising:
one or more processors; and
one or more computer-readable media storing instructions executable by the one or more processors, wherein the instructions program the one or more processors to:
access stored inventory data associated with a merchant that identifies one or more items offered for sale by the merchant;
present, via a merchant-facing user interface that presents information associated with a business of the merchant, one or more interaction capabilities to be associated with a tag for an item of the one or more items;
receive an indication of a first selection of at least one interaction capability of the one or more interaction capabilities;
generate an instruction for generating the tag, the tag being associated with encoded information enabling the at least one interaction capability; and
responsive to receiving an indication that a device operated by a customer interacted with the encoded information at a physical store of the merchant, causing a presentation of a user interface to facilitate at least one interaction corresponding to the at least one interaction capability.

10. A system as claim 9 recites, wherein:
the device is associated with a point-of-sale device;
the merchant-facing user interface is presented via a merchant-facing display associated with the point-of-sale device; and
the user interface is presented via a buyer-facing display associated with the point-of-sale device.

11. A system as claim 9 recites, wherein the instructions further program the one or more processors to:
determine a shared characteristic between the merchant and one or more other merchants; and
select the one or more interaction capabilities to present via the merchant-facing user interface based at least in part on the shared characteristic between the merchant and the one or more other merchants.

12. A system as claim 9 recites, wherein the instructions further program the one or more processors to:
determine, based at least in part on an identifier associated with the indication, an identity of the customer;
access data associated with behavior of the customer with at least one of the merchant or one or more other merchants; and
facilitate the at least one interaction based at least in part on the data associated with the behavior of the customer.

13. A system as claim 9 recites, wherein the at least one interaction capability enables the customer to split a cost of the item with another customer, and the instructions further program the one or more processors to:
determine, based at least in part on the interaction, that the customer desires to split the cost of the item with the other customer;
send, to a different device operated by the other customer, a notification that the customer desires to split the cost of the item with the other customer;
receive, from the different device, a confirmation that the other customer agrees to split the cost of the item with the customer;
associate an indication to split the cost of the item with an identifier of the customer; and
responsive to receiving payment data associated with the customer, charge a first portion of the cost of the item to a first payment instrument of the customer and a second portion of the cost of the item to a second payment instrument associated with the other customer.

14. A system as claim 9 recites, wherein the at least one interaction capability enables the customer to share a virtual representation of the item with another customer via an augmented reality application, and the instructions further program the one or more processors to:
receive data associated with a multi-dimensional model of the item, the data collected via a camera associated with a data collection device and the multi-dimensional model corresponding to the virtual representation;

associate the data with an instance of the item in the stored inventory data of the merchant;

determine, based at least in part on the interaction, that the customer desires to share the virtual representation of the item with the other customer; and send, to a different device operated by the other customer, the data associated with the multi-dimensional model of the item, the augmented reality application causing the virtual representation of the item to be presented in an environment of the other customer.

15. A system as claim 9 recites, wherein the instructions further program the one or more processors to:

responsive to receiving an indication that the device interacted with the encoded information at the physical store of the merchant, determine at least one of a discount, a special payment, news, or customer-specific information associated with the item; and present, via the user interface, a notification associated with at least one of the discount, the special payment, the news, or the customer-specific information associated with the item.

16. A computer-implemented method comprising:

determining, based at least in part on merchant data associated with a merchant, one or more interaction capabilities for a tag associated with an item in an inventory of the merchant, the tag configured to be positioned proximate to the item offered for sale by the merchant at a physical store of the merchant, and wherein the inventory is stored in an database associated with a payment processing service;

receiving an indication associated with a selection of at least one interaction capability of the one or more interaction capabilities;

generating, based at least in part on the indication, encoded information associated with the at least one interaction capability; and generating an instruction for generating the tag including the encoded information, the encoded information to enable a presentation of a user interface to facilitate the at least one interaction capability via a device operated by a user at the physical store of the merchant, the user interface configured to receive input associated with the at least one interaction capability.

17. A computer-implemented method as claim 16 recites, further comprising:

determining, based at least in part on the merchant data associated with the merchant, a shared characteristic between the merchant and one or more other merchants; and determining at least one of (i) the one or more interaction capabilities or (ii) a design for the tag based at least in part on the shared characteristic between the merchant and the one or more other merchants.

18. A computer-implemented method as claim 16 recites, wherein the interaction capability is associated with:

determining whether the item is available at another physical store of the merchant or via another merchant;

adding the item to a virtual shopping cart for future fulfillment;

presenting information associated with one or more additional items that are related to the item;

splitting a cost of the item with another customer;

sharing a virtual representation of the item with another customer and/or viewing variations of an item via an augmented reality application; or presenting a notification associated with at least one of a discount, a special payment, news, or customer-specific information associated with the item.

19. A computer-implemented method as claim 16 recites, further comprising:

receiving an indication that the device operated by a customer interacted with the encoded information at the physical store of the merchant; and causing a presentation of the user interface via the device to facilitate at least one interaction corresponding to the at least one interaction capability.

20. A computer-implemented method as claim 16 recites, wherein the encoded information is associated with a short-range communication tag or a barcode.

* * * * *